United States Patent [19]
Inoue et al.

[11] Patent Number: 5,976,274
[45] Date of Patent: Nov. 2, 1999

[54] SOFT MAGNETIC AMORPHOUS ALLOY AND HIGH HARDNESS AMORPHOUS ALLOY AND HIGH HARDNESS TOOL USING THE SAME

[75] Inventors: Akihisa Inoue; Tao Zhang, both of Miyagi-ken, Japan

[73] Assignee: Akihisa Inoue, Miyagi-Ken, Japan

[21] Appl. No.: 09/010,800

[22] Filed: Jan. 22, 1998

[30] Foreign Application Priority Data

| | | | |
|---|---|---|---|
| Jan. 23, 1997 | [JP] | Japan | 9-010693 |
| Mar. 25, 1997 | [JP] | Japan | 9-072470 |
| Mar. 25, 1997 | [JP] | Japan | 9-072473 |
| Jul. 25, 1997 | [JP] | Japan | 9-200555 |
| Aug. 29, 1997 | [JP] | Japan | 9-235287 |

[51] Int. Cl.$^6$ ............................................. H01F 1/153
[52] U.S. Cl. ........................................................ 148/304
[58] Field of Search ................................. 148/304, 403

[56] References Cited

U.S. PATENT DOCUMENTS

| 4,859,256 | 8/1989 | Sawa et al. | 148/304 |
| 5,738,733 | 4/1998 | Inoue et al. | 148/304 |

*Primary Examiner*—John Sheehan
*Attorney, Agent, or Firm*—Brinks Hofer Gilson & Lione

[57] ABSTRACT

The present invention provides an amorphous alloy containing at least one element of Fe, Co, and Ni as a main component, at least one element of Zr, Nb, Ta, Hf, Mo, Ti and V, and B, wherein the temperature width $\Delta Tx$ of a supercooled liquid region expressed by the equation $\Delta Tx = Tx-Tg$ (wherein Tx indicates the crystallization temperature, and Tg indicates the glass transition temperature) is 20° C. or more. The amorphous alloy has excellent soft magnetic properties and high hardness, and can suitably be used for a transformer, a magnetic head, a tool, etc.

3 Claims, 20 Drawing Sheets

SOFT MAGNETIC AMORPHOUS ALLOY AND HIGH HARDNESS AMORPHOUS ALLOY AND HIGH HARDNESS TOOL USING THE SAME

BACKGROUND OF THE INVENTION

1. Field of the Invention

The present invention relates to a high-hardness amorphous alloy and a high-hardness tool using the same or an amorphous alloy having soft magnetism, and particularly to an amorphous alloy which has a wide overcooled liquid region and which can be obtained in a thick shape.

2. Description of the Related Art

Some of conventional multi-element alloys are known as amorphous alloys (glassy alloys) having a wide supercooled liquid temperature region before recrystallization. This type of amorphous alloy is also known to be formed a bulk shape thicker than an amorphous alloy ribbon produced by a conventional known melt quenching method.

Conventional known amorphous alloy ribbons include ribbons of Fe-P-C amorphous alloys produced in the 1960s, (Fe,Co,Ni)-P-B system and (Fe,Co,Ni)-Si-B system alloys produced in the 1970s, (Fe,Co,Ni)-M(Zr,Hf,Nb) system alloys produced in the 1980s, and (Fe,Co,Ni)-M(Zr,Hf,Nb)-B system alloys. All these alloy ribbons must be produced by quenching at a cooling rate at the level of $10^{5°}$ C./S, and the produced ribbons have a thickness of 50 $\mu$m or less.

However, all of these conventional known amorphous alloys have no magnetism at room temperature, and when these alloys are considered as magnetic materials, there is a large industrial limit from this point of view. Also the amorphous alloys do not have sufficient hardness, and are thus insufficient for practical use.

Therefore, research and development have conventionally progressed for amorphous alloys which have magnetism at room temperature and which can be obtained in a thick bulk shape.

Although alloys having various compositions exhibit a supercooled liquid region, the temperature width $\Delta Tx$ of the supercooled liquid region, i.e., the difference between the crystallization temperature (Tx) and the glass transition temperature (Tg), i.e., the value of (Tx−Tg), is generally small, and these alloys have the low ability to form an amorphous phase and are thus impractical. Considering this property, alloys which have a wide supercooled liquid region, and which can form amorphous alloys by cooling can overcome the limit to the thickness of a conventional known amorphous alloy ribbon, and thus should attract much attention from a metallurgical stand point. However, whether such alloys can be developed as industrial materials depends upon discovery of an amorphous alloy exhibiting ferromagnetism at room temperature.

As amorphous alloys having magnetism, Fe-Si-B system alloys are conventionally known. This system of amorphous alloy has a high saturation magnetic flux density, but has problems in which magnetostriction is at the level of as high as $1\times10^{-5}$, sufficient soft magnetic characteristics cannot be obtained, heat resistance is low, electric resistance is low, and an eddy-current loss is large when the alloy is used as a core material for a transformer. On the other hand, Co-based amorphous alloys have excellent soft magnetic characteristics, but have problems in which heat stability is poor, electric resistance is not sufficiently high, and thus an eddy-current loss is large when the alloys are used as core materials for transformers. In addition, in the Fe-Si-B system and Co-based amorphous alloys, a amorphous phase can be formed only under the conditions of quenching from a melt, as described above. The formation of a bulk solid thus requires this system of alloy to be passed through the step of grinding the ribbon obtained by quenching a melt and sintering under pressure, thereby causing the problems of requiring a large number of steps and embrittling moldings.

On the other hand, a high-hardness tool comprising a base material and a high-hardness thin film of a carbide, a nitride, a boride or diamond, which is formed thereon, is frequently used. Although the iron group alloys, Mo, ceramics, cemented carbides, cermet and the like are conventionally used as the base material, these materials are unsatisfactory in point of any one of hardness, toughness, and adhesion between the base material and the high hardness thin film, and a base material having further excellent properties is required for a high-hardness tool.

SUMMARY OF THE INVENTION

In consideration of the above situation, a first object of the present invention is to provide a soft magnetic amorphous alloy which has a supercooled liquid region having a very large temperature width, which has soft magnetism at room temperature, and which can be produced in a shape thicker than an amorphous alloy ribbon obtained by a conventional melt quenching method.

In order to solve the above problems, a second object of the present invention is to provide an amorphous alloy which has low magnetostriction, excellent heat resistance, high electric resistance, a low eddy-current loss and the high ability to form an amorphous phase, and from which an amorphous molding can easily be obtained by a casting method under slow cooling conditions.

In search for a high-hardness material having excellent characteristics as a base material for a high-hardness tool, the inventors found that certain types of amorphous alloys have a supercooled liquid state having a relatively wide temperature width, and the possibility of producing bulk-shaped amorphous solids by a casting method accompanied with more slowly cooling, and that the obtained amorphous solids have high hardness and excellent characteristics as a base material for a high-hardness tool, resulting in achievement of the present invention.

Therefore, a third object of the present invention is to provide a high-hardness amorphous alloy from which a bulk-shaped amorphous solid can easily be formed, and a high-hardness tool comprising the amorphous alloy used as a base material.

In accordance with the present invention, a soft magnetic amorphous alloy comprises at least one element of Fe, Co and Ni as a main component, at least one element of Zr, Nb, Ta, Hf, Mo, Ti and V and B, wherein the temperature width $\Delta Tx$ of the supercooled liquid region expressed by the equation $\Delta Tx=Tx-Tg$ (wherein Tx indicates the crystallization start temperature, and Tg indicates the glass transition temperature) is 20° C. or more.

In the present invention, the soft magnetic amorphous alloy m ay have the composition necessarily containing Zr and $\Delta Tx$ of 25° C. or more.

The soft magnetic amorphous alloy may have $\Delta Tx$ of 60° C. or more and a composition expressed by the following formula:

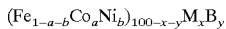

wherein $0\leq a\leq 0.29$, $0\leq b\leq 0.43$, 5 atomic $\%\leq x\leq 20$ atomic %, 10 atomic $\%\leq y\leq 22$ atomic %, and M is at least one element of Zr, Nb, Ta, Hf, Mo, Ti and V.

In the present invention, the above composition formula $(Fe_{1-a-b}Co_aNi_b)_{100-x-y}M_xB_y$ satisfies the relations of $0.042 \leq a \leq 0.29$, and $0.042 \leq b \leq 0.43$.

In the present invention, the soft magnetic amorphous alloy may have $\Delta Tx$ of 60° C. or more and a composition expressed by the following formula:

$$(Fe_{1-a-b}Co_aNi_b)_{100-x-y}M_xB_yT_z$$

wherein $0 \leq a \leq 0.29$, $0 \leq b \leq 0.43$, 5 atomic % $\leq x \leq 15$ atomic %, 10 atomic % $\leq y \leq 22$ atomic %, 0 atomic % $\leq z \leq 5$ atomic %, M is at least one element of Zr, Nb, Ta, Hf, Mo, Ti and V, and T is at least one element of Cr, W, Ru, Rh, Pd, Os, Ir, Pt, Al, Si, Ge, C and P.

In the present invention, the formula $(Fe_{1-a-b}Co_aNi_b)_{100-x-y-z}M_xB_yT_z$ satisfies the relations of $0.042 \leq a \leq 0.29$, and $0.042 \leq b \leq 0.43$.

In the formula, the element M may be represented by $(M'_{1-c}M''c)$ wherein M' is one or both of Zr and Hf, M'' is at least one element of Nb, Ta, Mo, Ti and V, and $0 \leq c \leq 0.6$.

Further, in the formula, c may be in the range of $0.2 \leq c \leq 0.4$ or the range of $0 \leq c \leq 0.2$.

In the present invention, the formula may satisfy the relations $0.042 \leq a \leq 0.25$, and $0.042 \leq b \leq 0.1$.

In the present invention, the soft magnetic amorphous alloy may be annealed at 427 to 627° C.

Further, in the composition, 50% or less of element B may be substituted by C.

In the present invention, the above alloy may be used as a high-hardness amorphous alloy.

Further, the alloy may be used as a base material comprising a hard-hardness alloy for a hard-hardness tool.

The present invention also provides a Co-based amorphous soft magnetic alloy represented by the following composition formula 1:

$$Co_{100-x-y-z-w}T_xM_yM'_zB_w \qquad \text{Formula 1:}$$

wherein T is one or both of Fe and Ni, M is at least one element of Zr, Nb, Ta, Hf and No, M' is at least one element of W, Cr, Mn, Ru, Rh, Pd, Os, Ir, Pt, Al, Ga, Si, Ge, C and P, $0 \leq x \leq 20$ (atomic %), $5 \leq y \leq 15$ (atomic %), $0 \leq z \leq 10$ (atomic %) and $15 \leq y \leq 22$ (atomic %).

The Co-based amorphous soft magnetic alloy preferably satisfies the relation $8 \leq x \leq 20$ (atomic %) and has a glass transition point Tg. The temperature width $\Delta Tx$ of the supercooled liquid region, i.e., the difference between the glass transition temperature Tg and the crystallization temperature Tx, represented by the equation, $\Delta Tx = Tx - Tg$ (wherein Tx is the crystallization temperature, and Tg is the glass transition temperature), is preferably 20° C. or more.

Further, the Co-based amorphous soft magnetic alloy preferably satisfies the relation $0 \leq x \leq 8$ (atomic %) and has an absolute value of magnetostriction of $1 \times 10^{-6}$ or less.

DESCRIPTION OF THE PREFERRED EMBODIMENT

Figure 1:
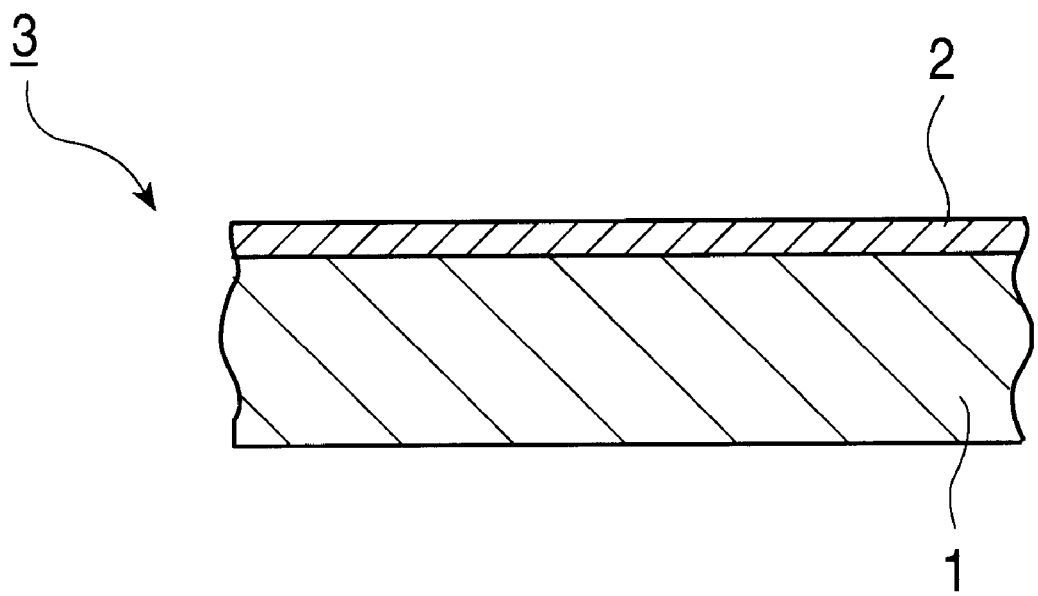
FIG. 1 is a sectional view of the structure of a high-hardness tool in accordance with an embodiment of the present invention.

Embodiments of the present invention will be described below with reference to the drawings.

A soft magnetic amorphous alloy of the present invention is realized in a component system comprising at least one of Fe, Co and Ni as a main component, and predetermined amounts of at least one of Zr, Nb, Ta, Hf, Mo, Ti and V, and B.

The soft magnetic amorphous alloy of the present invention can be expressed by the following formula:

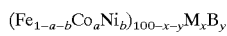

$(Fe_{1-a-b}Co_aNi_b)_{100-x-y}M_xB_y$ wherein the relations $0 \leq a \leq 0.29$, $0 \leq b \leq 0.43$, 5 atomic $\% \leq x \leq 20$ atomic %, and 10 atomic $\% \leq y \leq 22$ atomic % are preferably satisfied, and M is at least one element of Zr, Nb, Ta, Hf, Mo, Ti and V.

In the component system, the temperature width $\Delta Tx$ of the supercooled liquid region expressed by the equation $\Delta Tx = Tx - Tg$ (wherein Tx indicates the crystallization start temperature, and Tg indicates the glass transition temperature) must be 20° C. or more.

The composition system preferably necessarily contains Zr, and has a $\Delta Tx$ value of 25° C. or more.

In the composition system, $\Delta Tx$ is preferably 60° C. or more.

Further, the composition system $(Fe_{1-a-b}Co_aNi_b)_{100-x-y}M_xB_y$ preferably satisfies the relations $0.042 \leq a \leq 0.29$ and $0.042 \leq b \leq 0.43$.

Another soft magnetic amorphous alloy of the present invention is expressed by the formula $(Fe_{1-a-b}Co_aNi_b)_{100-x-y-z}M_xB_yT_z$ wherein $0 \leq a \leq 0.29$, $0 \leq b \leq 0.43$, 5 atomic $\% \leq x \leq 20$ atomic %, 10 atomic $\% \leq y \leq 22$ atomic %, 0 atomic % 5 $t \leq 5$ atomic %, M is at least one element of Zr, Nb, Ta, Hf, Mo, Ti and V, and T is at least one element of Cr, W, Ru, Rh, Pd, Os, Ir, Pt, Al, Si, Ge, C and P.

In the present invention, the composition $(Fe_{1-a-b}Co_aNi_b)_{100-x-y-z}M_xB_yT_z$ may satisfy the relations $0.042 \leq a \leq 0.29$ and $0.042 \leq b \leq 0.43$.

The element M may be represented by $(M'_{1-c}M''_c)$ wherein M' is one or both of Zr and Hf, M" is at least one of Nb, Ta, Mo, Ti and V, and $0 \leq c \leq 0.6$.

Further, in the composition, c may be in the range of $0.2 \leq c \leq 0.4$ or $0 \leq c \leq 0.2$.

Further, in the present invention, the relations $0.042 \leq a \leq 0.25$ and $0.042 \leq b \leq 0.1$ may be satisfied.

In the present invention, the soft magnetic amorphous alloy may be heat-treated at 427° C. (700 K) to 627° C. (900 K). The soft magnetic amorphous alloy heat-treated in this temperature range exhibits high magnetic permeability. If the alloy is quenched during cooling after heating, an amorphous phase is not formed, but a crystalline phase is precipitated. Therefore, the cooling rate after heat treatment must be as low as possible, and slow cooling or annealing is preferably carried out after heating. In the above composition, 50% or less of B atoms may be substituted by C.

(Reason for Limiting the Composition)

In the composition system of the present invention, the main components Fe, Co and Ni are elements which bear magnetism and are important for obtaining a high saturation magnetic flux density and excellent soft magnetic properties. In a component system containing a large amount of Fe, $\Delta Tx$ is easily increased and can be increased to 60° C. or more by setting the Co and Ni contents to appropriate values. Specifically, in order to securely obtain $\Delta Tx$ of 50° C. to 60° C., the a value indicating the composition ratio of Co is preferably in the range of $0 \leq a \leq 0.29$, and the b value indicating the composition ratio of Ni is preferably in the range of $0 \leq b \leq 0.43$. In order to securely obtain $\Delta Tx$ of 60° C. or more, the a value indicating the composition ratio of Co is preferably in the range of $0.042 \leq a \leq 0.29$, and the b value indicating the composition ratio of Ni is preferably in the range of $0.042 \leq b \leq 0.43$.

In the above ranges, the a value indicating the composition ratio of Co is preferably in the range of $0.042 \leq a \leq 0.25$ in order to obtain good soft magnetic characteristics, and the b value indicating the composition ratio of Ni is preferably in the range of $0.042 \leq b \leq 0.1$ in order to obtain a high saturation magnetic flux density.

M is at least one element of Zr, Nb, Ta, Hf, Mo, Ti and V. These elements are effective for producing an amorphous phase, and the M content is preferably in the range of 5 to 20 atomic %. In order to obtain high magnetic properties, the M content is more preferably 5 to 15 atomic %. Of these elements M, Zr or Hf is particularly effective. Zr or Hf can partly be substituted by an element such as Nb or the like. If Zr or Hf is substituted, a composition ratio c in the range of $0 \leq c \leq 0.6$ permits achievement of high $\Delta Tx$, but the ratio c is preferably in the range of $0.2 \leq c \leq 0.4$ in order to obtain $\Delta Tx$ of 80° C. or more.

B has the high ability to form an amorphous phase, and in the present invention, B is added in the range of 10 to 22 atomic %. Out of this range, a B content of less than 10 atomic % is undesirable because $\Delta Tx$ disappears, and a B content of over 22 atomic % is undesirable because an amorphous phase cannot be formed. In order to obtain the higher ability to form an amorphous phase and good magnetic characteristics, the B content is preferably 16 to 20 atomic %.

At least one element of Cr, W, Ru, Th, Pd, Os, Ir, Pt, Al, Si, Ge, C and P, which is denoted by T, can be further added to the above composition system.

In the present invention, these elements can be added in the range of 0 to 5 atomic %. These elements are mainly added for improving corrosion resistance. Out of this range, soft magnetic characteristics deteriorate, and also the ability to form an amorphous phase undesirably deteriorates.

In order to produce a soft magnetic amorphous alloy material in the above composition system, for example, powders of the respective component elements are prepared and mixed so that the above composition ranges can be obtained, and the thus-obtained powder mixture is then melted by a melting device such as a crucible in an atmosphere of an inert gas such as an Ar gas to obtain an alloy melt.

Next the alloy melt is quenched by the single roll method to obtain a soft magnetic amorphous alloy material. The single roll method is a method in which the melt is quenched by spraying on a rotating metallic roll to obtain an amorphous alloy ribbon.

A high-hardness amorphous alloy in accordance with another embodiment of the present invention will be described below.

A high-hardness amorphous alloy of the present invention basically comprises elements in the following three groups:

F group: at least one of Fe, Co and Ni

M group: at least one of Zr, Nb, Ta, Hf, Mo, W and Cr
B group: B (boron)
wherein the temperature width ΔTx of the supercooled liquid region represented by the equation ΔTx=Tx−Tg (wherein Tx indicates the crystallization start temperature, and Tg indicates the glass transition temperature) is 20° C. or more.

A composition which satisfies the above conditions has a wide supercooled liquid region on the low temperature side of the crystallization temperature Tx in cooling from a melt state, and forms an amorphous alloy by the time it reaches the glass transition temperature Tg after passing through the supercooled liquid region having a temperature width ΔTx. Since the temperature width ΔTx of the supercooled liquid region is wide, unlike a conventional known amorphous alloy, an amorphous solid can be obtained without quenching, and thus a thick block-shaped material can be formed by a casting method or the like. The amorphous alloy obtained has high hardness, and measurement of Vickers hardness showed 1300 to 1500 Hv. The amorphous alloy was also found to have good adhesion to high hardness thin films of a carbide, a nitride, a boride, an oxide and diamond, and excellent suitability for use as the base material of a high hardness tool. Particularly, the amorphous alloy containing Zr as a component in M group and having ΔTx of 25° C. or more was found to exhibit very high hardness and suitable as the base material of a high hardness tool.

Of the elements which form the amorphous alloy, B has the high ability to form an amorphous phase, and is preferably contained in the amorphous alloy composition in the range of 10 to 22 atomic % in order to suppress crystallization in cooling. A B content of less than 10 atomic % is undesirable because ΔTx is decreased or disappears, and a B content of over 22 atomic % is undesirable because high hardness cannot be obtained.

The composition of the above amorphous alloy can generally be expressed by the following formula:

$(Fe_{1-a-b}Co_aNi_b)_{100-x-y}M_xB_y$      formula 1

In the formula, assuming that the total of F group elements is 1, a and b indicate the numbers of Co and Ni atoms, respectively, and x and y indicate the contents by atomic % of elements in M group and B group, respectively, relative to the total of the amorphous alloy.

In the high-hardness amorphous alloy of the present invention expressed by the above formula 1, with respect to an element in F group as a main component, a component system containing at least Fe shows the tendency that ΔTx is further increased. Therefore, in a component system containing Fe, the value of ΔTx is increased by appropriately setting the Co content (a) and the Ni content (b), thereby facilitating the formation of a thick amorphous solid. Particularly, it was found that when a is in the range of 0 to 0.29, b is in the range of 0 to 0.43, an M group element (x) is in the range of 5 to 15 atomic %, and B (y) is in the range of 17 to 22 atomic %, ΔTx is 60° C. or more, and a high-hardness bulk molding which can be used as the base material of a high-hardness tool can easily be obtained. In the above composition, a is more preferably in the range 0.042 to 0.29, and b is more preferably in the range of 0.042 to 0.43.

Besides the above element groups, the high-hardness amorphous alloy of the present invention may contain as a T group element at least one of the following elements:

T group: Ru, Rh, Pd, Os, Ir, Pt, Al, Si, Ge, C and P
The elements in T group mainly have the effect of improving the corrosion resistance of the high-hardness amorphous alloy of the present invention. In this case, the composition of the high-hardness amorphous alloy can be expressed by the following formula 2:

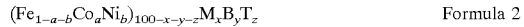

$(Fe_{1-a-b}Co_aNi_b)_{100-x-y-z}M_xB_yT_z$      Formula 2

In the formula, z indicates the content by atomic % of a T group element relative to the total of the elements of the amorphous alloy.

Particularly, when a is in the range of 0 to 0.29, b is in the range of 0 to 0.43, F group elements contain at least Fe, x is in the range of 5 to 15 atomic %, y is in the range of 17 yo 22 atomic %, and z is in the range of 0 to 5 atomic %, the high-hardness amorphous alloy of the present invention expressed by the above formula 2 has ΔTx of 60° C. or more, and a thick molding having suitability for use as the base material of a high-hardness tool can be obtained. In the above composition, more preferably, a is in the range of 0.042 to 0.29, and b is in the range of 0.042 to 0.43.

In the high-hardness amorphous alloy of the present invention, M group elements in the above formula 1 or 2 may be expressed by the following formula 3:

$(M'_{1-c}M''_c)$      formula 3 wherein M' is one or both of Zr and Hf, M'' is at least one element of Nb, Ta, Hf, Mo, W and Cr, and c indicates the number of atoms of a M' element on the basis of the total of 1 of M group element. Preferably, c is in the range of 0 to 0.6, i.e., the alloy necessarily contains one or both of Zr and Hf. More preferably, c is in the range of 0.2 to 0.4.

In order to produce an amorphous solid of the high-hardness amorphous alloy of the present invention, it is necessary to cool a melt of this alloy while maintaining a supercooled liquid state to form a solid. Cooling methods generally include a quenching method and a slow cooling method.

An example of the quenching method, for example, a method called the single roll method is known. In this method, single element powders of the respective component elements are mixed so that the above composition ranges can be obtained, and the resultant powder mixture is then melted by a melting device such as a crucible in an atmosphere of an inert gas such as an Ar gas or the like to form a melt of the alloy. Next the melt is quenched by spraying on a rotating metallic roll for cooling to obtain an amorphous alloy ribbon. At this time, the high-hardness amorphous alloy of the present invention has the supercooled liquid region having a sufficiently large temperature width ΔTx, and it is thus possible to decrease the cooling rate and obtain a relatively thick plate-shaped solid.

By employing the sufficiently large temperature width ΔTx of the supercooled liquid region, the high-hardness amorphous alloy of the present invention also enables a molding method comprising slow cooling, such as an injection casting method comprising casting in a copper mold. As the casting device, of course, popular devices having various structures can be used, and a continuous casting device can also be used.

In any cases, the high-hardness amorphous alloy may be crystallized by quenching, casting or heat treatment under conditions which allow crystallization. In this case, a harder alloy can be expected.

A high-hardness tool comprising the high-hardness amorphous alloy as a base material will be described.

The base material of the tool comprising the high-hardness amorphous alloy can be produced as an amorphous molding through a supercooled state, for example, by heating the amorphous alloy composition to a melt temperature of 900 K (627° C.) or more to form a melt, and then casting the melt in a predetermined mold to cool the melt. Before or after releasing the mold, heat treatment may be carried out according to demand, as described above.

The base material of the tool can also be produced by cutting an amorphous block of the high-hardness amorphous alloy. If required, the base material can be formed by pouring an amorphous powder of the high-hardness amorphous alloy into a mold, and then heating the powder at a temperature where the surfaces of the powder particles are fused to each other while closely pressing it to sinter the powder.

Since the thus-obtained amorphous molding of the high-hardness amorphous alloy has high hardness, not only the molding can be used as an apparatus member which is required to have high hardness, but also a molding having wearing resistance and called a sintered hard material can be obtained by depositing at least one high-hardness thin film 2 on the surface of a base material 1 molded by using the high-hardness amorphous alloy. The thus-obtained molding 3 has high availability as a high-hardness tool. Therefore, the present invention provides a high-hardness tool comprising a base material made of the high-hardness amorphous alloy, and at least one high-hardness thin film formed thereon.

As the high-hardness thin film 2, high-hardness materials conventionally used in this field can be appropriately selected and used. An example of preferable materials for forming the high-hardness thin film comprises any one of carbides, nitrides, oxides, borides of the metals in Group 4A, 5A or 6A in the periodic table; aluminum oxide; aluminum nitride; boron carbide; boron nitride; silicon oxide; silicon carbonitride; and diamond; or a mixture of at least two materials thereof. The high hardness thin film may be formed as either a single layer or multiple layers of at least two layers on the base material comprising the high-hardness amorphous alloy of the present invention.

In order to form the high-hardness thin film on the base material comprising the high-hardness amorphous alloy, conventional various known methods can be used. Examples of such methods include a vacuum deposition method, a sputtering vacuum deposition method using an ion beam, magnetron, high frequency or the like, an arc discharge ion plating method, a plasma CVD method, a plasma jet CVD method, and the like. The high-hardness amorphous alloy molding comprising the hard-hardness thin film formed on the surface thereof by the above method is particularly useful as a cutting tool.

A Co-based amorphous alloy in accordance with present invention will be described below.

The Co-based amorphous alloy of the present invention has the composition expressed by the above formula 1 and basically comprises component elements in the following five groups:

Co: a base element of the soft magnetic amorphous alloy

F' group: one or both of Fe and Ni

M group: at least one of Zr, Nb, Ta, Hf and Mo

M' group: at least one of W, Cr, Mn, Ru, Rh, Pd, Os, Ir, Pt, Al, Ga, Si, Ge, C and P B: boron Regarding the constituent ratios of elements in these groups, the F' group element is in the range of 0 to 20 atomic %, the M group element is 5 to 15 atomic %, the M' group element is 0 to 10 atomic %, B is in the range of 15 to 22 atomic %, and the control comprises Co.

In the Co-based amorphous soft magnetic alloy of the present invention, the elements in the above groups integrally form a amorphous alloy having soft magnetism, but each of the element groups is considered attributing to the properties described below.

Co: This serves as a base of the alloy and bears magnetism.

F' group: This is also an element bearing magnetism. Particularly, if 8 atomic % or more of Fe is mixed, the glass transition point Tg occurs, and thus a supercooled liquid state can easily be obtained. However, if the Fe content exceeds 20 atomic %, magnetostriction undesirably increases to $1\times10^{-6}$ or more.

M group: This has the effect of increasing the temperature width ΔTx of the supercooled liquid state and forms an amorphous phase. When the mixing amount is less than 5 atomic % or less, no glass transition point Tg undesirably occurs. When the mixing amount exceeds 15 atomic %, the melting point increases, and foreign matter is undesirably easily mixed in the alloy from a nozzle or the like during quenching.

M' group: This has the effect of improving the corrosion resistance of the alloy. However, when an element of this group is compounded in a large amount of over 10 atomic %, magnetic characteristics and amorphous phase formability undesirably deteriorate.

B: This has the high ability to form an amorphous phase, and compounding of 15 to 22 atomic % of B has the effect of increasing resistivity and improving thermal stability. With a compounding amount of less than 15 atomic %, the ability to form an amorphous phase is insufficient, and ΔTx decreases or disappears. With a compounding amount of over 22 atomic %, magnetic characteristics undesirably deteriorate.

The Co-based amorphous soft magnetic alloy of the present invention has a glass transition point Tg, wherein the difference between the glass transition point Tg and the crystallization temperature Tx, i.e., the temperature width ΔTx of the supercooled liquid region expressed by the following equation is preferably 20° C. or more.

$$\Delta Tx = Tx - Tg$$

(wherein Tx is the crystallization temperature, and Tg is the glass transition temperature). A composition which satisfies the above condition has a wide supercooled liquid region having a temperature width of 20° C. or more on the low temperature side of the crystallization temperature Tx in cooling from a melt state, and forms an amorphous alloy without crystallization by the time it reaches the glass transition point Tg after passing through the supercooled liquid region having the temperature width ΔTx with decreases in temperature. Since the temperature width ΔTx of the supercooled liquid region is as large as 20° C. or more, unlike conventional known amorphous alloys, an amorphous sold can be obtained without quenching, and a thick block material can thus be formed by a method such as casting or the like.

Particularly, when a Co-based amorphous soft magnetic alloy having low magnetostriction is needed, in the formula 1, the mixing amount x of the T group element (Fe and/or Ni) is preferably in the range of 0 to 8 atomic %. This can decrease the absolute value of magnetostriction to $1\times10^{-6}$ or less.

In production of an amorphous solid comprising the Co-based amorphous solid magnetic alloy of the present invention, it is necessary to cool a melt of a composition comprising the above elements while maintaining a supercooled liquid state to solidify the melt. General cooling methods include the quenching method and the slow cooling method.

As an example of the quenching method, for example, a method called the single roll method is known. This method comprises mixing single element powders of the respective component elements so as to obtain the composition ratios, and then melting the resultant powder mixture in a melting device such as a crucible or the like in an atmosphere of an inert gas such as Ar gas or the like to form an alloy melt. Then the thus-obtained melt is quenched by spraying on a rotating metallic roll for cooling to obtain a ribbon-shaped amorphous alloy solid.

The thus-obtained ribbon is ground, and the resultant amorphous powder is poured into a mold and then sintered by heating to a temperature at which the surfaces of the power particles are fused to each other while closely pressing it to produce a block-shaped molding. When the alloy melt is cooled by the single roll method, if the temperature width $\Delta Tx$ of the supercooled liquid region is sufficiently large, the cooling rate can be decreased, and thus a relatively thick plate-shaped solid can be obtained. For example, a core material for a transformer can be formed. Further, by employing the sufficiently large temperature width $\Delta Tx$ of the supercooled liquid region, the Co-based amorphous soft magnetic alloy of the present invention can be cast by slow cooling using a casting mold. Further, a fine wire can be formed by an in-liquid spinning method, and a thin film can be formed by sputtering or vapor deposition.

As described above in detail, the Co-based amorphous soft magnetic alloy of the present invention is excellent in magnetic characteristics and formability, and is thus useful as a member of a transformer or a magnetic head. Since the Co-based amorphous soft magnetic alloy also exhibits the so-called MI effect that when an AC current is applied to a magnetic material, a voltage occurs in the material due to impedance, and the amplitude changes with an external magnetic field in the lengthwise direction of the material, the alloy can be used as an MI element.

EXAMPLES

Single pure metals of Fe, Co, Ni and Zr, and a pure boron crystal were mixed in an Ar gas atmosphere, followed by arc melting to produce a master alloy.

Next, the master alloy was melted in a crucible, and then quenched by the single roll method comprising spraying the melt on a copper roll, which was rotated at a rate of 40 m/s, from a nozzle having a diameter of 0.4 mm at the lower end of the crucible under an injection pressure of $0.39 \times 10^5$ Pa in an argon gas atmosphere, to produce a sample of an amorphous alloy ribbon having a width of 0.4 to 1 mm and a thickness of 13 to 22 $\mu$m. The thus-obtained sample was analyzed by X-ray diffraction and differential scanning calorimetry (DSC), and observed by a transmission electron microscope (TEM), and magnetic permeability was measured in the temperature range of room temperature to the Curie temperature by a vibrating sample type magnetometer (VSM) to obtain a B-H loop and measure magnetic permeability at 1 kHz.

Figure 2:
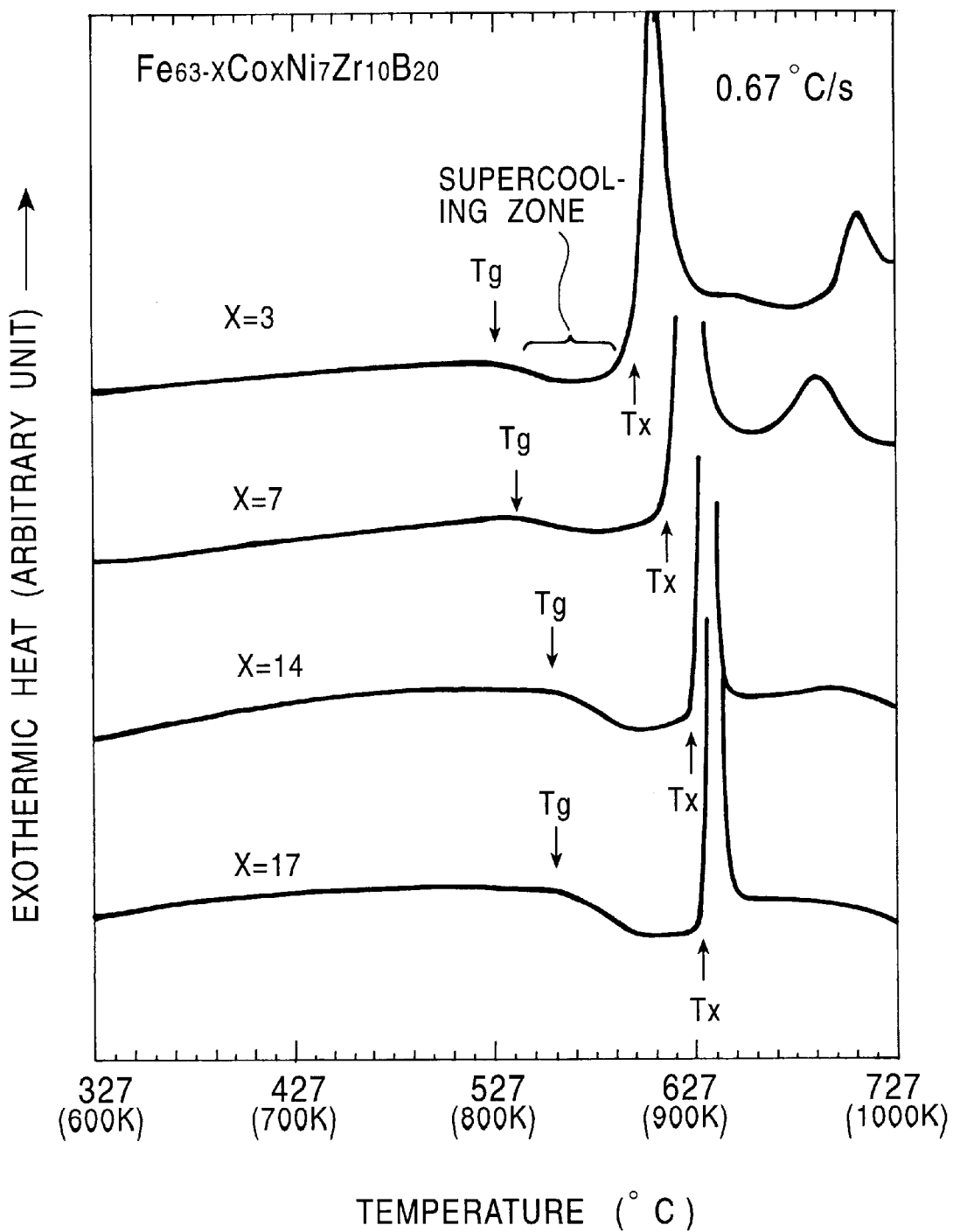
FIG. 2 is a diagram showing the DSC curve of an amorphous alloy ribbon sample having each of the compositions $Fe_{60}Co_3Ni_7Zr_{10}B_{20}$, $Fe_{56}Co_7Ni_7Zr_{10}B_{20}$, $Fe_{49}Co_{14}Ni_7Zr_{10}B_{20}$, and $Fe_{46}Co_{17}Ni_7Zr_{10}B_{20}$.

FIG. 2 shows the DSC curve of each of amorphous alloy ribbon samples respectively having the compositions, $Fe_{60}Co_3Ni_7Zr_{10}B_{20}$, $Fe_{56}Co_7Ni_7Zr_{10}B_{20}$, $Fe_{49}Co_{14}Ni_7Zr_{10}B_{20}$, and $Fe_{46}Co_{17}Ni_7Zr_{10}B_{20}$.

In all of these samples, a wide supercooled liquid region could be confirmed by increasing the temperature, and crystallization was found to take place by heating beyond the supercooled liquid region. The temperature width $\Delta Tx$ of the supercooled liquid region is expressed by the equation $\Delta Tx = Tx - Tg$, and the values of $(Tx - Tg)$ of all samples shown in FIG. 2 exceed 60° C., and in the range of 64 to 68° C. A substantially equilibrium state showing the supercooled liquid region was obtained in the wide range of 596° C. (869 K) to 632° C. (905 K) slightly lower than the crystallization temperature shown by an exothermic peak.

Figure 3:
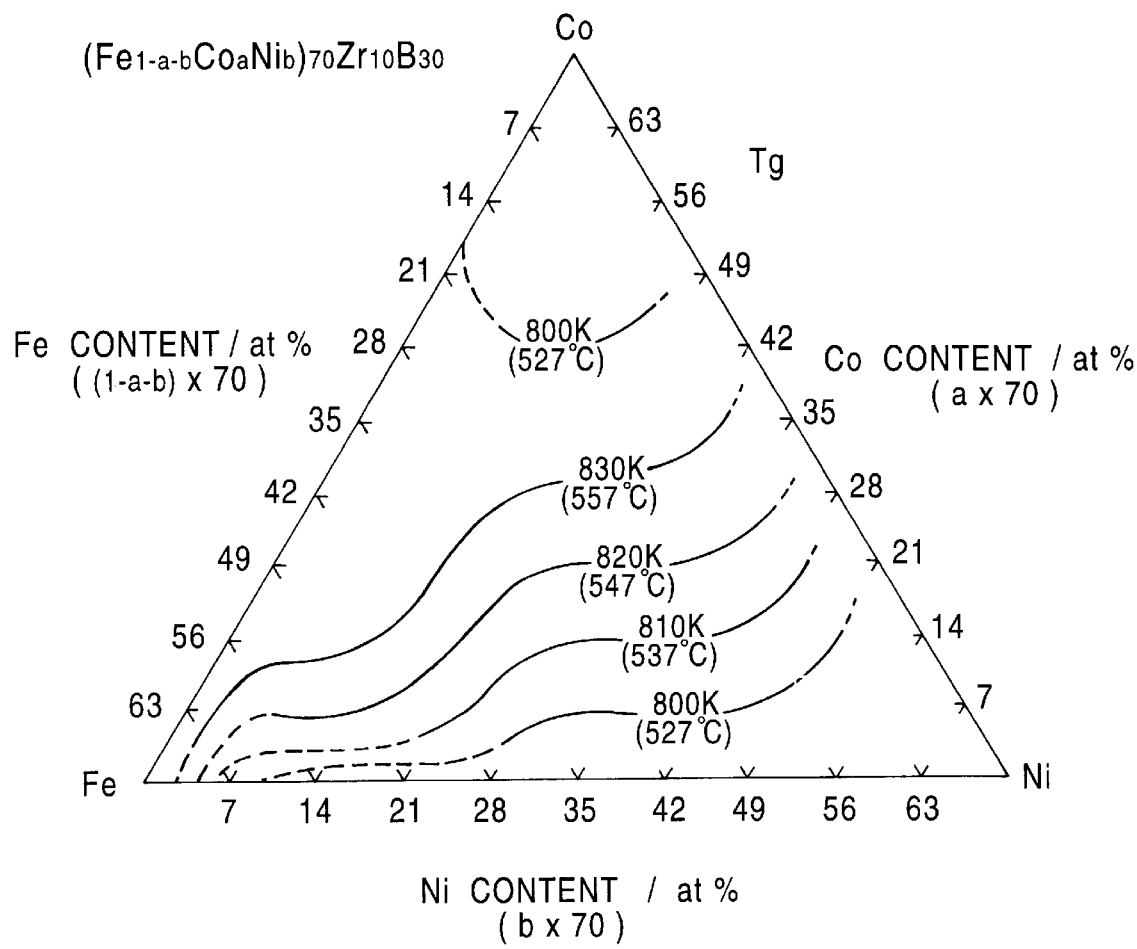
FIG. 3 is a triangular composition diagram showing the dependence of the Tg value on each of the Fe, Co and Ni contents in a $(Fe_{1-a-b}Co_aNi_b)_{70}M_{10}B_{20}$ composition system.
Figure 4:
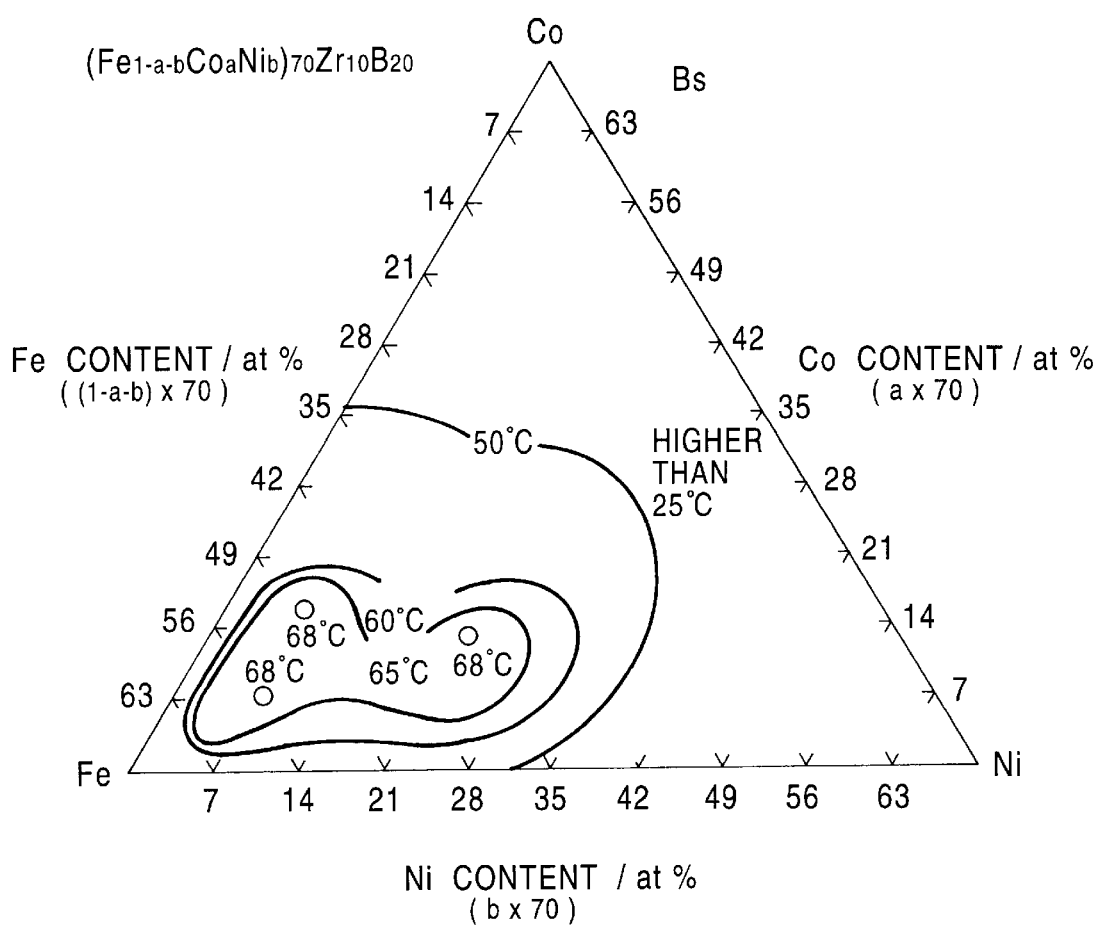
FIG. 4 is a triangular composition diagram showing the dependence of the value of $\Delta Tx$ (=Tx–Tg) on each of the Fe, Co and Ni contents in a $(Fe_{1-a-b}Co_aNi_b)_{70}M_{10}B_{20}$ composition system.
Figure 5:
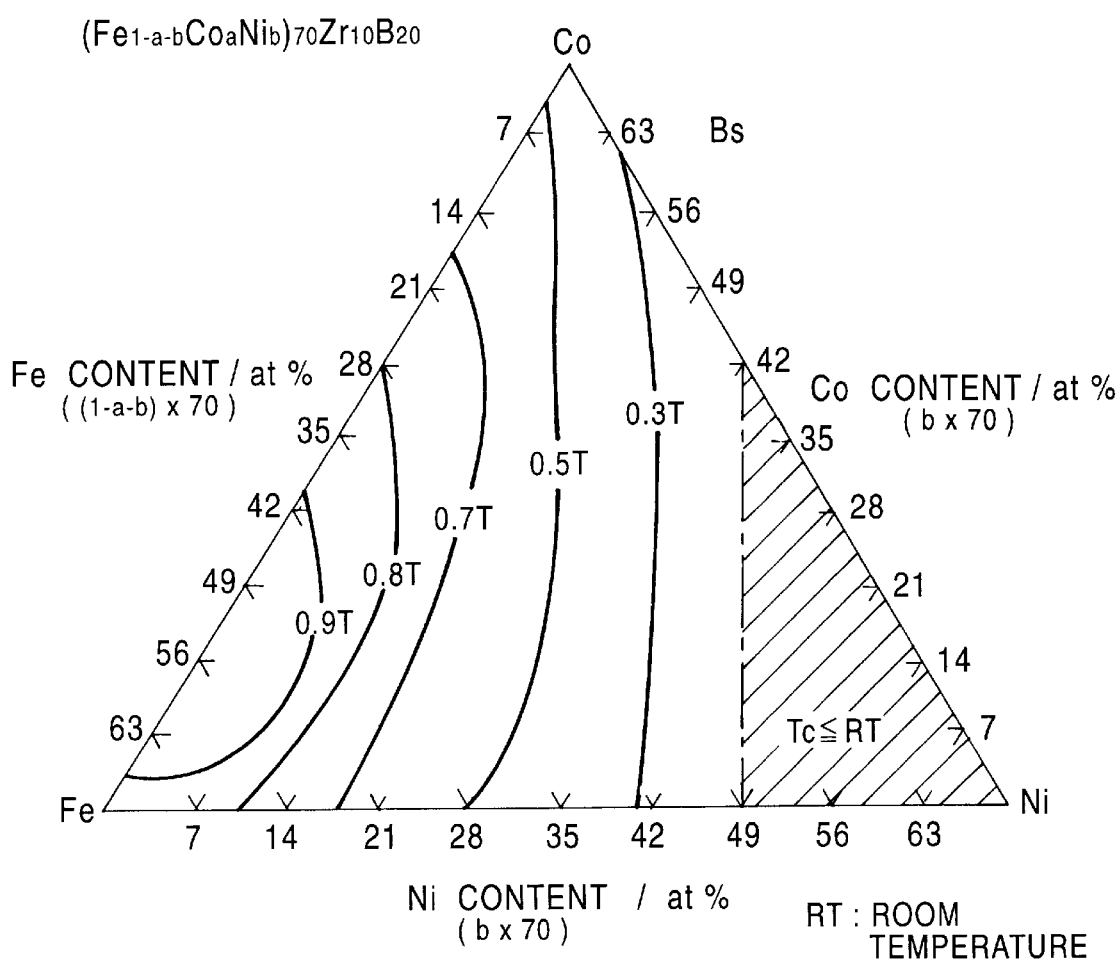
FIG. 5 is a triangular composition diagram showing the dependence of the value of saturation magnetic flux density (Bs) on each of the Fe, Co and Ni contents in a $(Fe_{1-a-b}Co_aNi_b)_{70}M_{10}B_{20}$ composition system.
Figure 6:
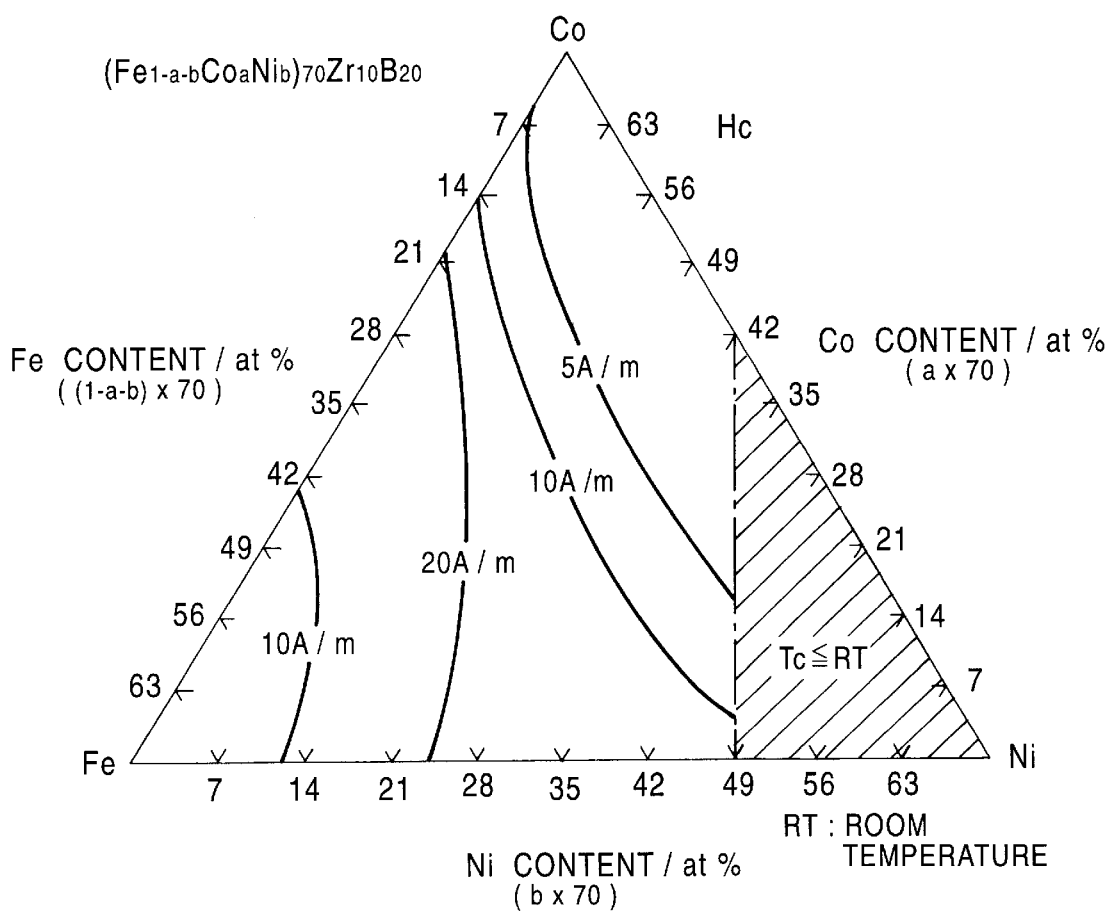
FIG. 6 is a triangular composition diagram showing the dependence of the value of coercive force (Hc) on each of the Fe, Co and Ni contents in a $(Fe_{1-a-b}Co_aNi_b)_{70}M_{10}B_{20}$ composition system.
Figure 7:
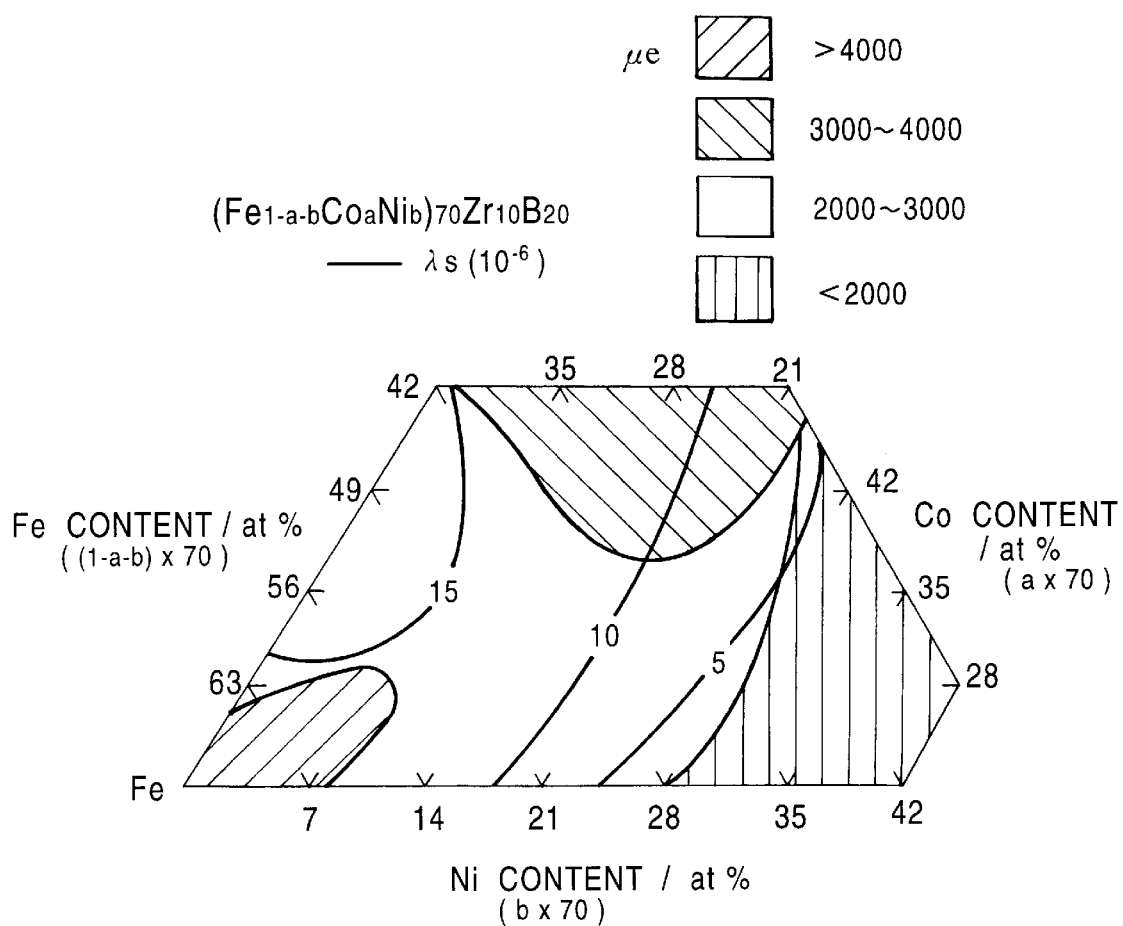
FIG. 7 is a triangular composition diagram showing the dependence of magnetic permeability ($\mu e$) and magnetostriction ($\lambda s$) on each of the Fe, Co and Ni contents in a $(Fe_{1-a-b}Co_aNi_b)_{70}M_{10}B_{20}$ composition system.

FIG. 3 is a triangular composition diagram showing the dependence of Tg value on each of the Fe, Co and Ni contents in a $(Fe_{1-a-b}Co_aNi_b)_{70}M_{10}B_{20}$ composition system, FIG. 4 is a triangular composition diagram showing the dependence of $\Delta Tx$ (=Tx-Tg) value on each of the Fe, Co and Ni contents in the same composition system as shown in FIG. 3, FIG. 5 is a triangular composition diagram showing the dependence of the value of saturation magnetization (Is) on each of the Fe, Co and Ni contents in the same composition system, FIG. 6 is a triangular composition diagram showing the dependence of the value of coercive force (Hc) on each of the Fe, Co and Ni contents in the same composition system, and FIG. 7 is a triangular composition diagram showing the dependence of the values of magnetic permeability ($\mu e$) and saturation magnetostriction ($\lambda s$) on each of the Fe, Co and Ni contents in the same composition system.

The results shown in FIG. 4 indicate that the $\Delta Tx$ value exceeds 25° C. over the whole range of the $(Fe_{1-a-b}Co_aNi_b)_{70}M_{10}B_{20}$ composition system. FIG. 3 reveals that in regard to the Tg value, Tg is simply increased by increasing the Co content in the range of about 7 (a=0.1) to 50 atomic % (a=0.71). On the other hand, FIG. 4 shows that in a composition system containing a large amount of Fe, the $\Delta Tx$ value is high, and in order to increase $\Delta Tx$ to 60° C. or more, the Co content and Ni content are preferably 3 to 20 atomic % and 3 to 30 atomic %, respectively.

In the $(Fe_{1-a-b}Co_aNi_b)_{70}M_{10}B_{20}$ composition system, in order to obtain a Co content of 3 atomic % or more, the composition ratio a of Co is 0.042 or more because $(Fe_{-a-b}Co_aNi_b)$ is 70 atomic %, and in order to obtain a Co content of 20 atomic % or less, the composition ratio a of Co is 0.29 or less. Similarly, the composition ratio b of Ni is 0.042 or more in order to obtain a Ni content of 3 atomic % or more, and the Ni composition ratio b is 0.43 or less in order to obtain a Ni content of 30 atomic % or less. Also comparison of FIGS. 5, 6 and 7 with FIG. 4 indicates that in a high $\Delta Tx$ region, saturation magnetization (Is), coercive force (Hc), magnetic permeability ($\mu e$) and saturation magnetostriction ($\lambda s$) are approximately good.

Figure 8:
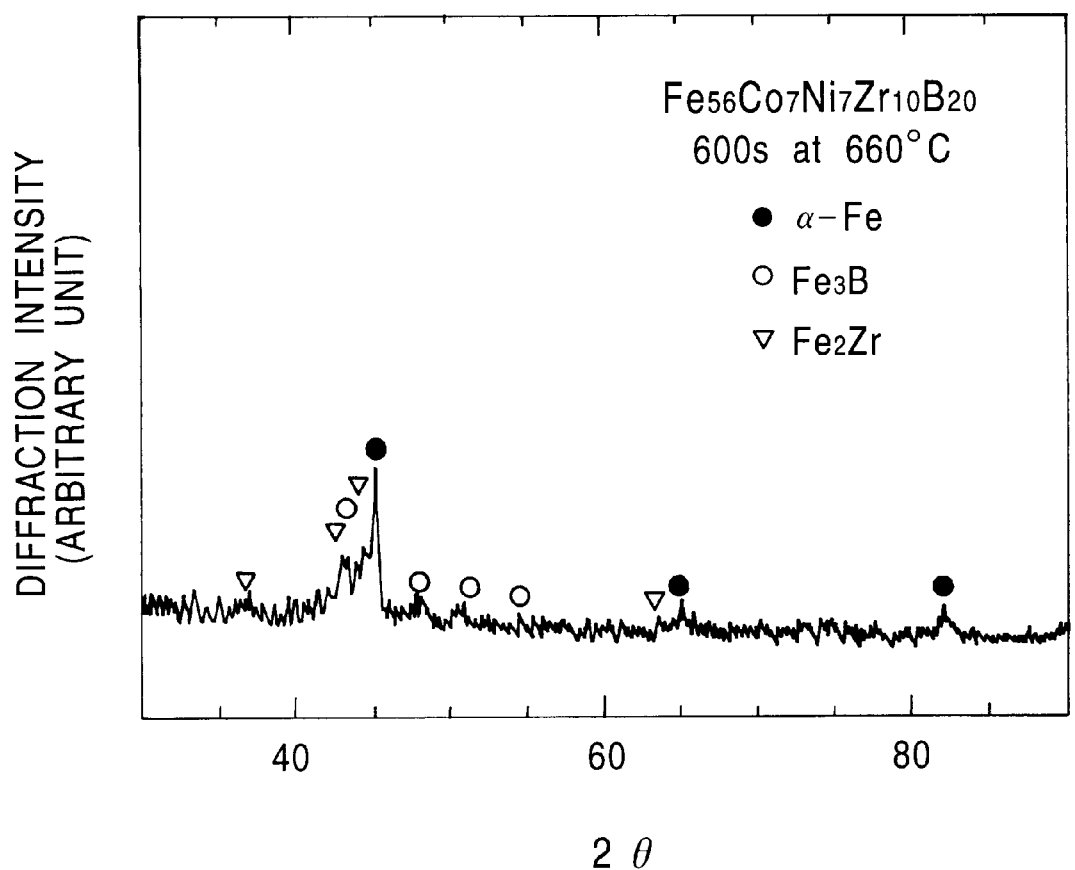
FIG. 8 is a chart showing the results of X-ray diffraction analysis of an amorphous alloy sample having a composition of $Fe_{56}Co_7Ni_7Zr_{10}B_{20}$ after annealing at 660° C. (933 K) for 10 minutes.

FIG. 8 shows the results of X-ray diffraction analysis of an amorphous alloy sample having the composition $Fe_{56}Co_7Ni_7Zr_{10}B_{20}$ after annealing at 660° C. (933 K) for 10 minutes. The annealing temperature of 660° C. is slightly higher than the temperature at which the sample of X=7 shown in FIG. 2 shows an exothermic peak and at which crystallization can possibly be caused by heat treatment.

In the diffraction pattern obtained, diffraction peaks of Fe, $Fe_3B$ and $Fe_2Zr$ were observed, and it was apparent that three types of crystalline phases were precipitated by crystallization.

Figure 9:
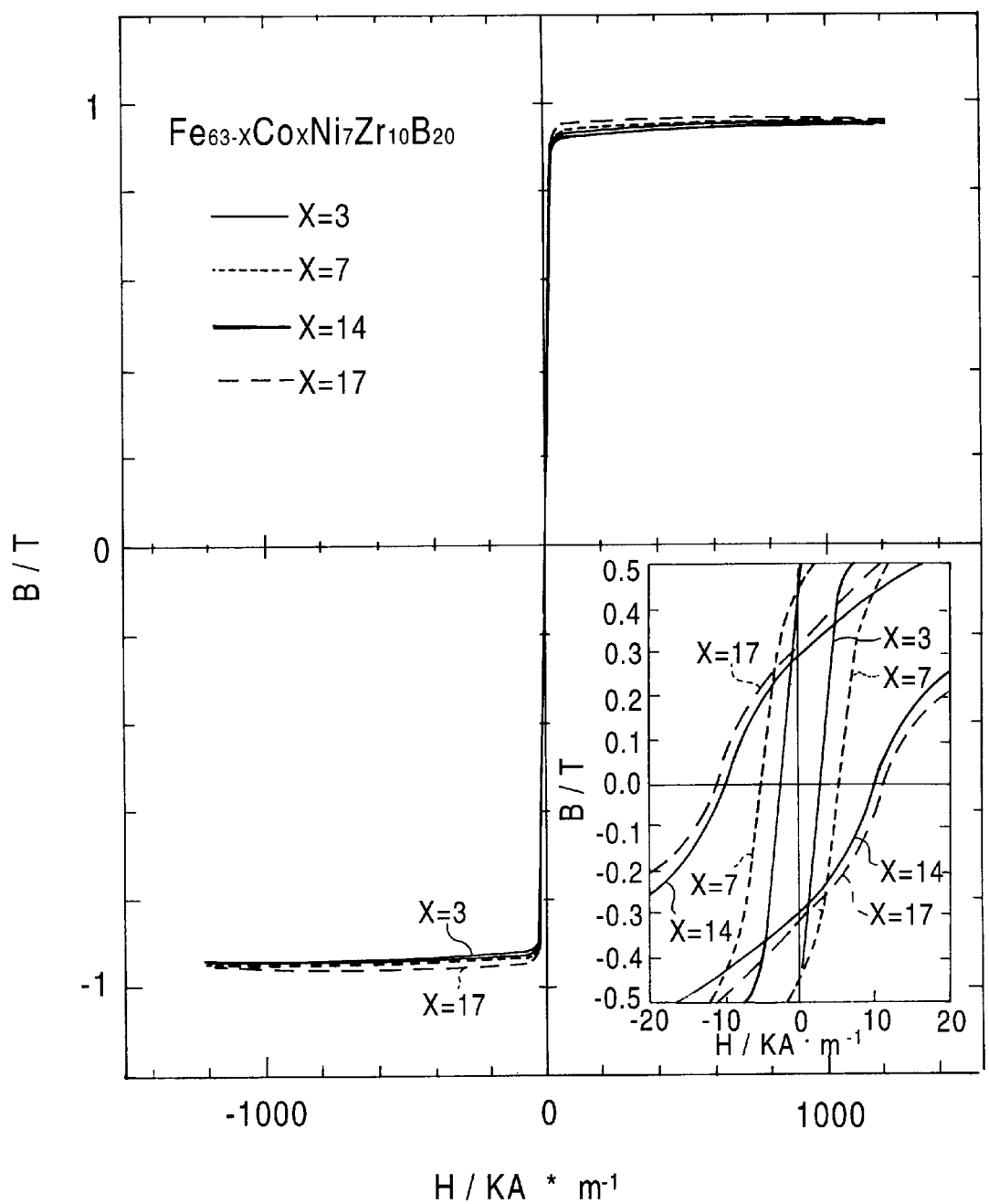
FIG. 9 is a diagram showing the B-H loop of each of samples having a composition of $Fe_{63-x}Co_xNi_7Zr_{10}B_{20}$ (x=3, 7, 14 and 17 atomic %)

FIG. 9 shows the B-H loop of each of samples having the composition $Fe_{63-x}Co_xNi_7Zr_{10}B_{20}$ (x=3, 7, 14 and 17 atomic %) after quenching in the single roll production method. The saturation magnetic flux density Bs was in the range of 0.91 to 0.96 T (tesla) without depending upon the Co content. The coercive force Hc was increased to 2.7 to 10 A/m in proportion to the Co content of 3 to 17 atomic %. The remanence ratio was in the range of 0.32 to 0.45, and the Curie temperature Tc of a sample having the composition $Fe_{56}Co_7Ni_7Zr_{10}B_{20}$ was 294° C. (567 K). It is thought from these soft magnetic characteristics that heat treatment is preferably carried out at 480.7° C. which is 60° C. lower than the glass transition temperature Tg (540.7° C., 813 K).

After annealing at this temperature for 10 minutes, the sample having the composition $Fe_{56}Co_7Ni_7Zr_{10}B_{20}$ exhibited a saturation magnetic flux density Bs of 0.96 T, a coercive force Hc of 2.41 A/m and a remanence ratio Br/Bs of 0.4 to 0.6.

Further, in the sample having the composition $Fe_{56}Co_7Ni_7Zr_{10}B_{20}$, magnetic permeability $\mu e$ at 1 kHz was 5100 and 17700 after quenching and after annealing, respectively. These results indicate that in a Fe-based composition system, the soft magnetic characteristics are improved by heat treatment.

For samples respectively having the compositions $Fe_{64}Co_3Ni_3Zr_{10}B_{20}$, $Fe_{60}Co_3Ni_7Zr_{10}B_{20}$, $Fe_{56}Co_7Ni_7Zr_{10}B_{20}$, $Fe_{49}Co_{14}Ni_7Zr_{10}B_{20}$, and $Fe_{46}Co_{17}Ni_7Zr_{10}B_{20}$, saturation magnetic flux density (Bs:T), coercive force (Hc:A/m) and magnetic permeability at 1 kHz were measured after quenching (quenching in production) and annealing at a temperature of each of 427° C. (700 K), 477° C. (750 K) and 527° C. (800 K) The results obtained are shown blow.

|  | Quenching | Annealing at 427° C. | Annealing at 477° C. | Annealing at 527° C. |
|---|---|---|---|---|
| O $Fe_{64}Co_3Ni_3Zr_{10}B_{20}$ sample | | | | |
| Bs | 0.91 | 0.88 | 0.91 | 0.92 |
| Hc | 3.4 | 2.9 | 2.6 | 2.0 |
| $\mu e$ | 4666 | 9639 | 12635 | 11882 |
| O $Fe_{60}Co_3Ni_7Zr_{10}B_{20}$ sample | | | | |
| Bs | 0.92 | 0.93 | 0.92 | 0.93 |
| Ec | 2.7 | 2.1 | 2.2 | 1.7 |
| $\mu e$ | 4173 | 9552 | 11702 | 10896 |
| O $Fe_{56}Co_7Ni_7Zr_{10}B_{20}$ sample | | | | |
| Bs | 0.95 | 0.95 | 0.96 | 0.94 |
| Hc | 6.1 | 2.88 | 2.41 | 3.06 |
| $\mu e$ | 5100 | 14260 | 17659 | 8121 |
| O $Fe_{49}Co_{14}Ni_7Zr_{10}B_{20}$ sample | | | | |
| Bs | 0.94 | 0.93 | 0.93 | 0.93 |
| Hc | 9.9 | 3.7 | 3.37 | 5.526 |
| O $Fe_{49}Co_{17}Ni_7Zr_{10}B_{20}$ sample | | | | |
| Bs | 0.96 | 0.95 | 0.95 | 0.96 |
| Hc | 10.8 | 3.2 | 3.3 | 6.4 |

These results of measurement reveal that in order to obtain good values of soft magnetic characteristics, Co is preferably 3 to 17 atomic %. i.e., the composition ratio a is 0.042 to 0.25.

Figure 10:
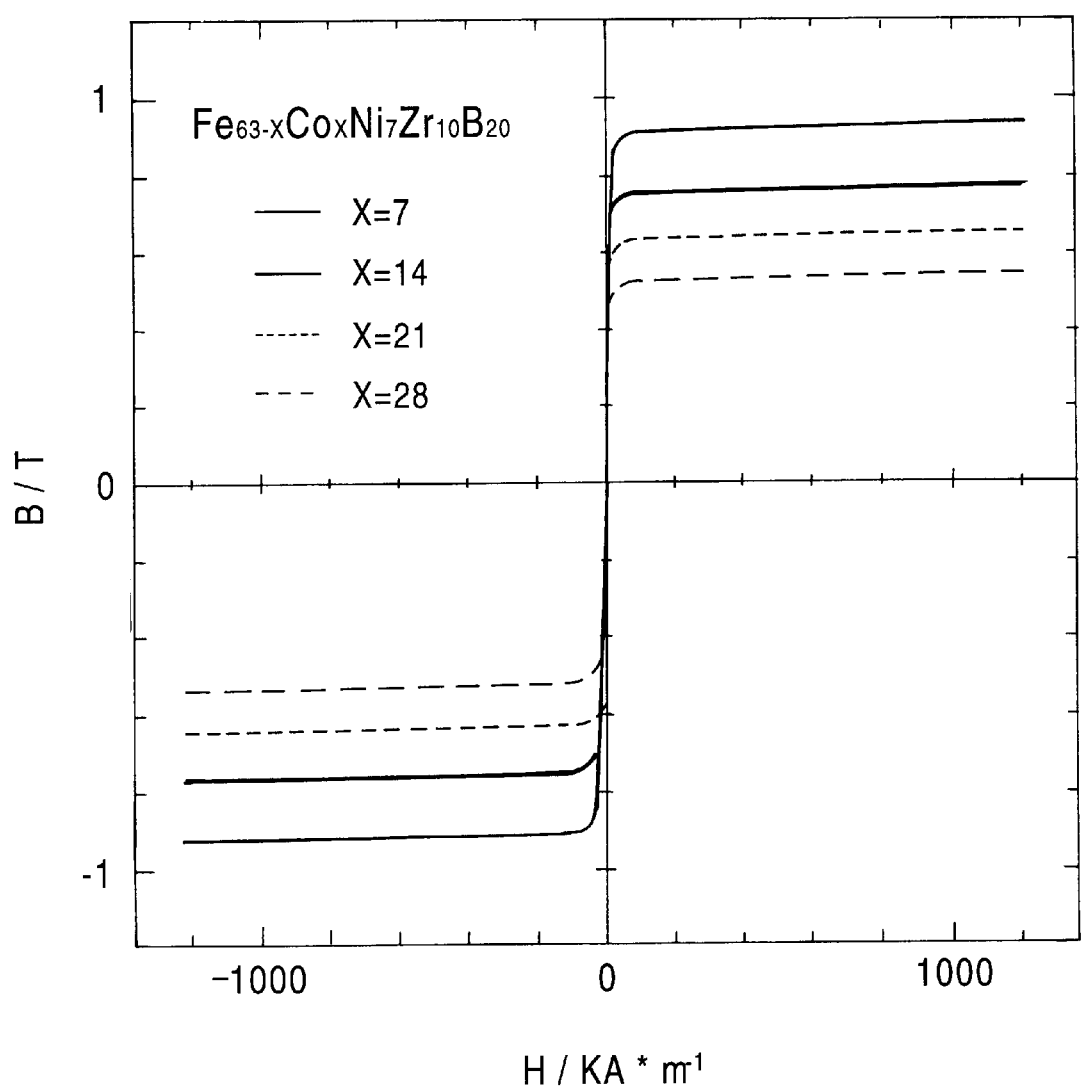
FIG. 10 is a diagram showing the B-H loop of each of samples having a composition of $Fe_{63-x}Co_7Ni_xZr_{10}B_{20}$ (x=7, 14, 21 and 28 atomic %) after quenching in production by a single roll method.

FIG. 10 shows the B-H loop of each of samples having the composition $Fe_{63-x}Co_7Ni_xZr_{10}B_{20}$ (x=7, 14, 21 and 28 atomic %) after quenching in the single roll production method. The saturation magnetic flux density Bs tends to decrease depending upon the Ni content. It is thus found that in order to obtain a high saturation magnetic flux density Bs, the Ni content is preferably 7 atomic % or less, i.e., the composition ratio b is preferably 0.1 or less.

Figure 11:
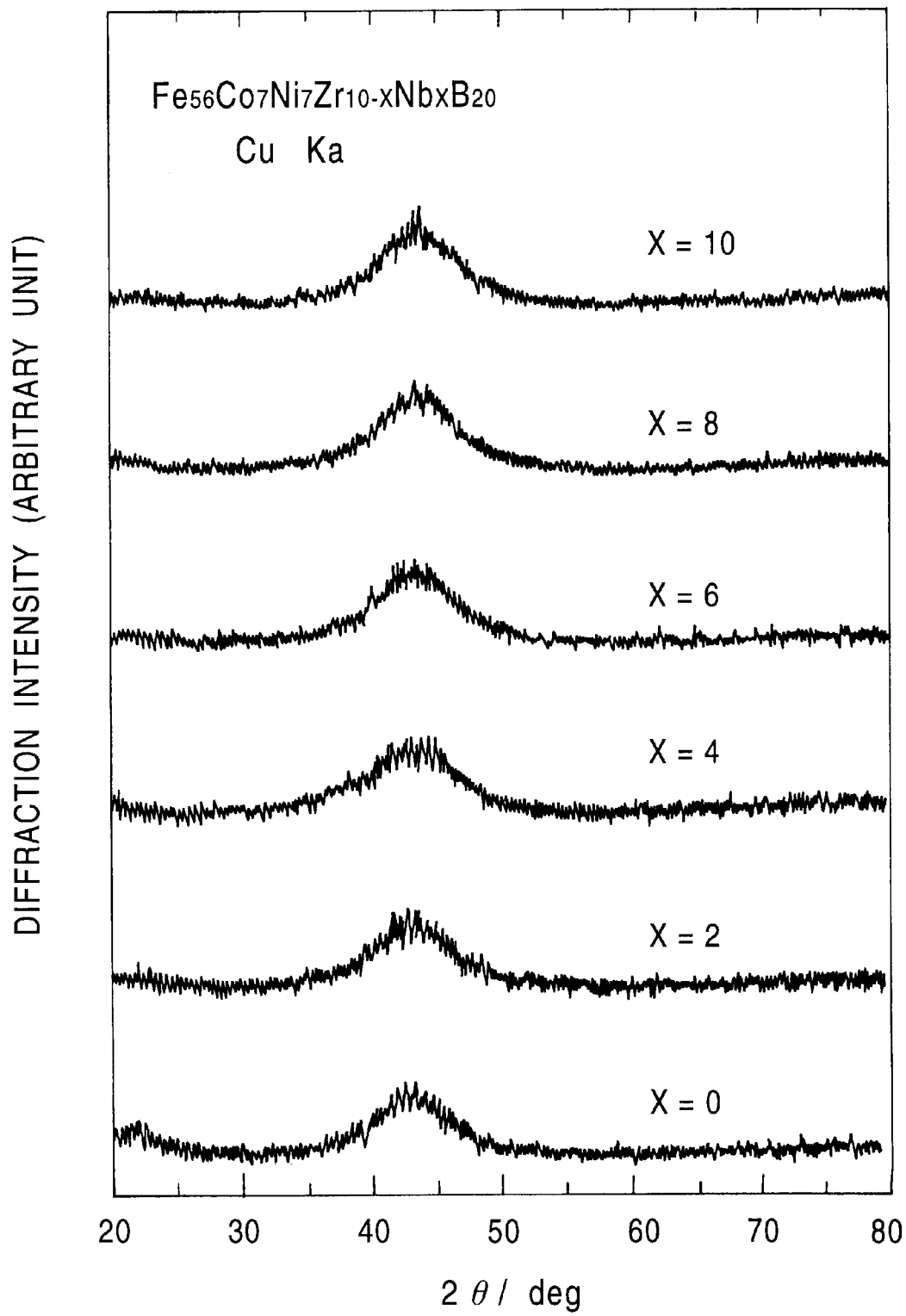
FIG. 11 is a diagram showing the X-ray diffraction pattern of each of samples having a composition of $Fe_{56}Co_7Ni_7Zr_{10-x}Nb_xB_{20}$ (x=0, 2, 4, 6, 8 and 10 atomic %) after quenching in production by a single roll method.

FIG. 11 shows the X-ray diffraction patterns of samples having the composition $Fe_{56}Co_7Ni_7Zr_{10-x}Nb_xB_{20}$ (x=0, 2, 4, 6, 8 and 10 atomic %) after quenching in the same single roll production method as described above.

All patterns obtained are typical broad patterns each of which shows an amorphous material, and it is apparent that all samples having the composition are amorphous.

Figure 12:
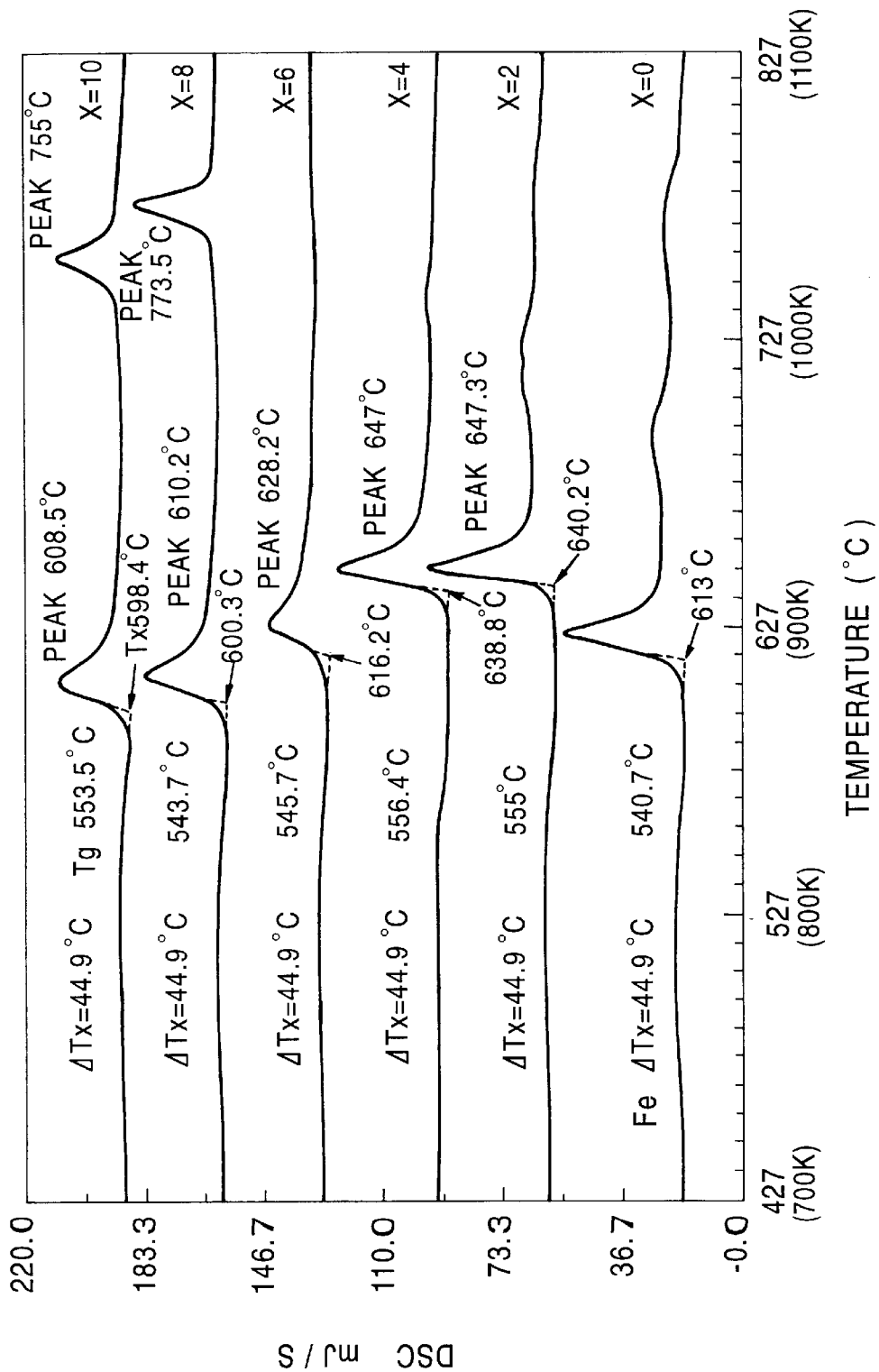
FIG. 12 is a diagram showing the result of DSC curve measurement of each of the samples shown in FIG. 11.

FIG. 12 shows the results of determination of DSC curves of the samples having the composition shown in FIG. 11.

It is found that in all samples, a wide supercooled liquid region in an equilibrium state is present in a temperature region lower than the exothermic peak temperature showing crystallization. A sample having an Nb content of 8 to 10 atomic % shows two exothermic peaks. Therefore, it is found that 6 atomic % or less of Nb is preferably added to this alloy system.

It is also found that in order to obtain a supercooled liquid region having a temperature width ($\Delta Tx$) of 80° C. in each of the composition samples shown in FIG. 12, when 10 atomic % of Zr is partly substituted by Nb, Nb is preferably 2 to 4 atomic %, i.e., composition ratio c is preferably 0.2 to 0.4. This is true of Hf.

Figure 13:
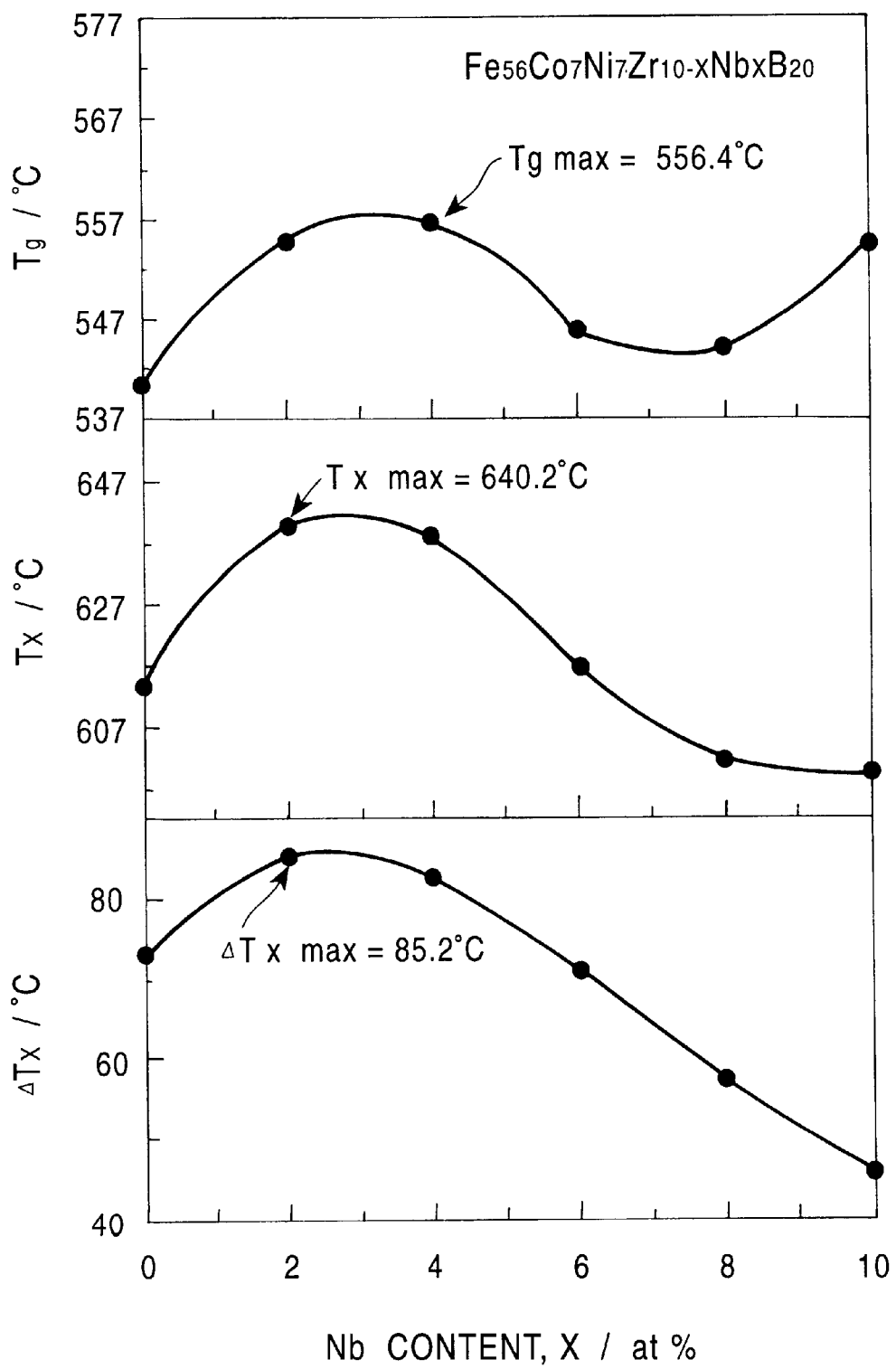
FIG. 13 is a diagram showing the dependence of glass transition temperature (Tg), crystallization temperature (Tx) and the temperature width ($\Delta Tx$) of a supercooled liquid region on the Nb content with respect to the samples shown in FIG. 11.

FIG. 13 shows the dependence of glass transition temperature (Tg), crystallization start temperature (Tx) and the temperature width ($\Delta Tx$) of the supercooled liquid region on the Nb content with respect to the composition samples shown in FIG. 11.

The sample not containing Nb has a glass transition temperature of 541° C. (814 K) and a crystallization start temperature of 613° C. (886 K), and the temperature width of the supercooled liquid region simply increases as the Nb content increases after the maximum Nb content in the range of 2 to 4 atomic %. The sample not containing Nb showed a supercooled liquid region having a temperature width of 73° C., the sample containing 2 atomic % of Nb showed a supercooled liquid region having the maximum temperature width of 85.2° C., and the sample having the composition $Fe_{56}Co_7Ni_7Nb_{10}B_{20}$ showed a supercooled liquid region having a temperature width of 45° C. These results indicate that an Nb content of about 8 to 10 atomic % causes a decrease in the temperature width of the supercooled liquid region and makes it difficult to obtain an amorphous phase.

Figure 14:
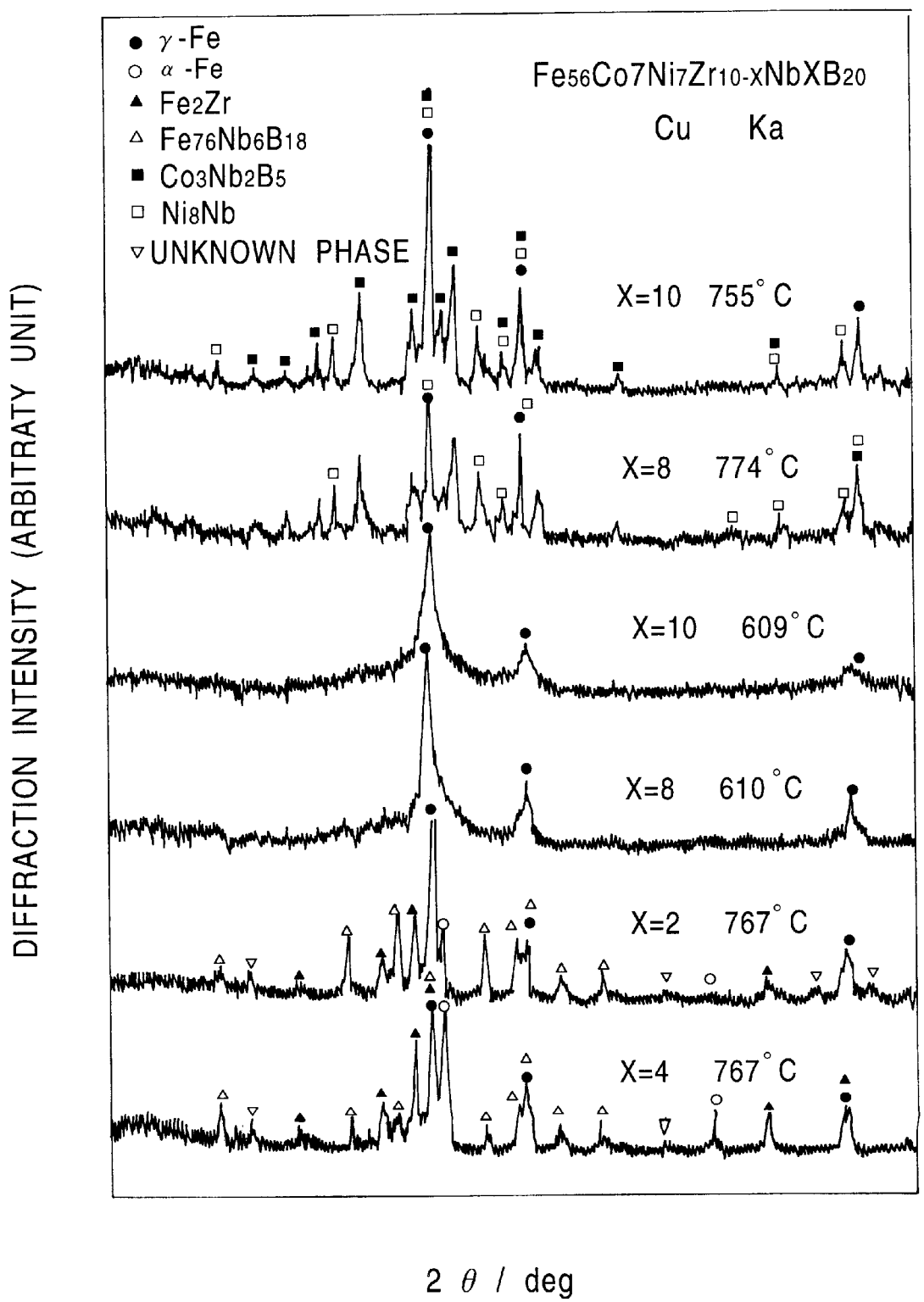
FIG. 14 is a diagram showing the results of X-ray analysis of a glassy alloy sample having a composition of $Fe_{56}Co_7Ni_7Zr_{10-x}Nb_xB_{20}$ after annealing at a temperature where an exothermic peak occurs, for 10 minutes.

FIG. 14 shows the results of X-ray diffraction analysis of amorphous alloy samples having the composition $Fe_{56}Co_7Ni_7Zr_{10-x}Nb_xB_{20}$ after annealing at a temperature where an exothermic peak occurs, for 10 minutes. In this figure, $\gamma$-Fe peaks are marked with •, $\alpha$-Fe peaks are marked with o, $Fe_2Zr$ peaks are marked with ▲, $Fe_{76}Nb_6B_{18}$ peaks are marked with ■, $Co_3Nb_2B_5$ peaks are marked with ■, $Ni_8Nb$ peaks are marked with □, and other exothermic peaks are marked with ▽.

Of samples having an Nb content of 2 to 4 atomic % and showing only one exothermic peak, as shown in FIG. 12, peaks of $\gamma$-Fe, $\alpha$-Fe, $Fe_2Zr$ and $Fe_{76}Nb_6B_{18}$ were observed in a sample heat-treated at the exothermic peak temperature (767° C.).

Of samples respectively having Nb contents of 8 and 10 atomic % and showing two exothermic peaks, as shown in FIG. 2, a $\gamma$-Fe peak was observed after annealing at each of temperatures of 610° C. and 609° C. near the respective first exothermic peaks, and $\gamma$-Fe, $Co_3Nb_2B_5$ and $Ni_8Nb$ peaks were observed after annealing at each of the second exothermic peak temperatures of 774° C. and 755° C.

It was apparent from these results that a sample having one exothermic peak produces precipitation of $\gamma$-Fe, $\alpha$-Fe, $Fe_2Zr$ and $Fe_{76}Nb_6B_{18}$ from an amorphous phase during crystallization, and a sample having two exothermic peaks produces precipitation of $\gamma$-Fe from an amorphous phase at the first exothermic peak, and precipitation of $\gamma$-Fe, $Co_3Nb_2B_5$ and $Ni_8Nb$ from the state comprising amorphous phase and $\gamma$-Fe at the second exothermic peak.

Figure 15:
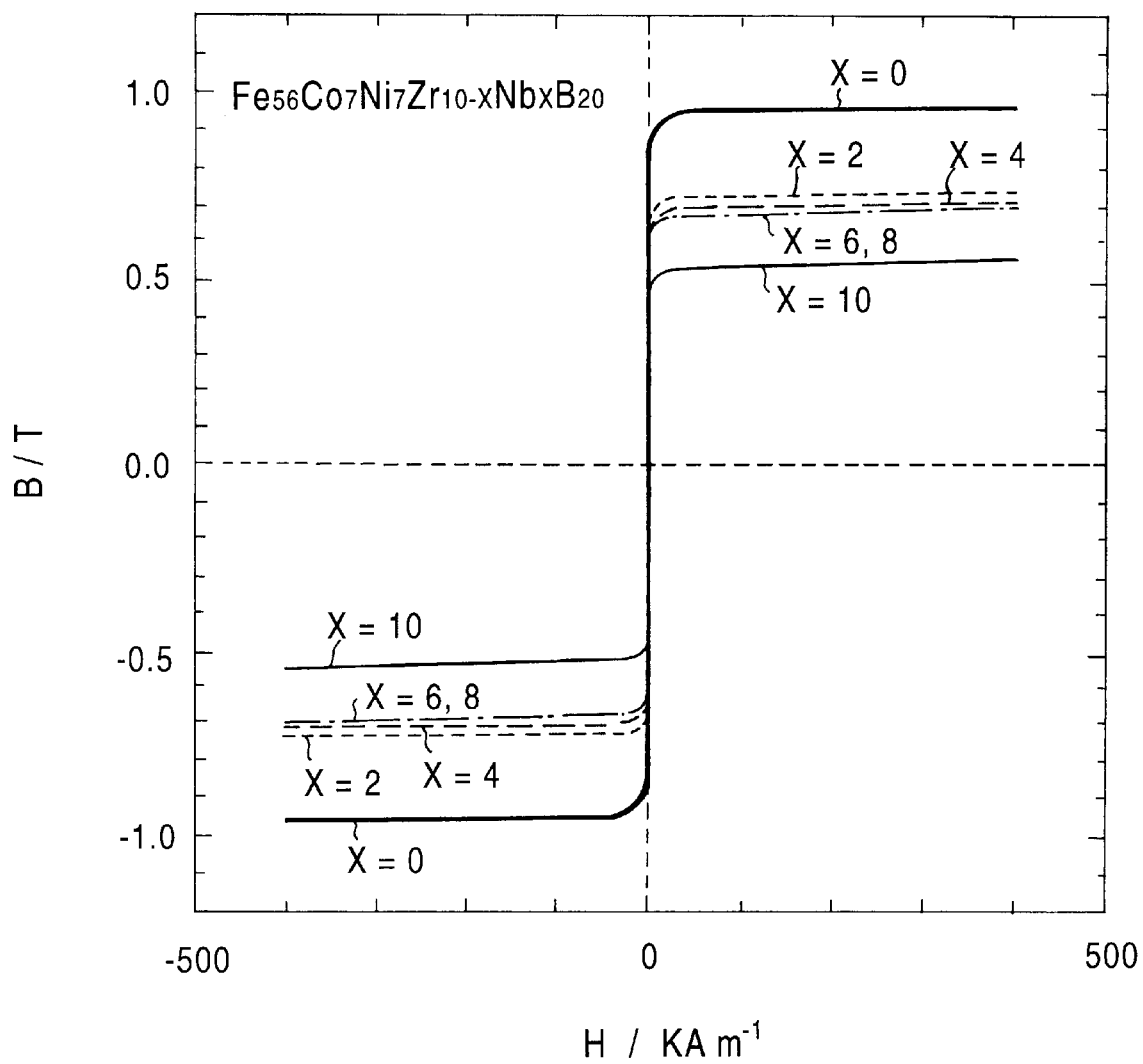
FIG. 15 is a diagram showing the B-H loop of each of samples having a composition of $Fe_{56}Co_7Ni_7Zr_{10-x}Nb_xB_{20}$ (x=0, 2, 4, 6, 8 and 10 atomic %) after quenching in a single roll production method.

FIG. 15 shows the B-H loop of each of samples having the composition $Fe_{56}Co_7Ni_7Zr_{10-x}Nb_xB_{20}$ (x=0, 2, 4, 6, 8 and 10 atomic %) after quenching in the single roll production method. The sample not containing Nb had a saturation magnetic flux density Bs of 0.92 T, the sample containing 10 atomic % of Nb had a Bs value of 0.55 T, and the sample containing 2 atomic % of Nb had a Bs value of 0.73 T. The sample not containing Nb had a coercive force Hc of 5.5 A/m, the sample containing 10 atomic % of Nb had a Hc value of 4.2 A/m, and the sample containing 2 atomic % of Nb had a Hc value of 4.6 A/m.

Figure 16:
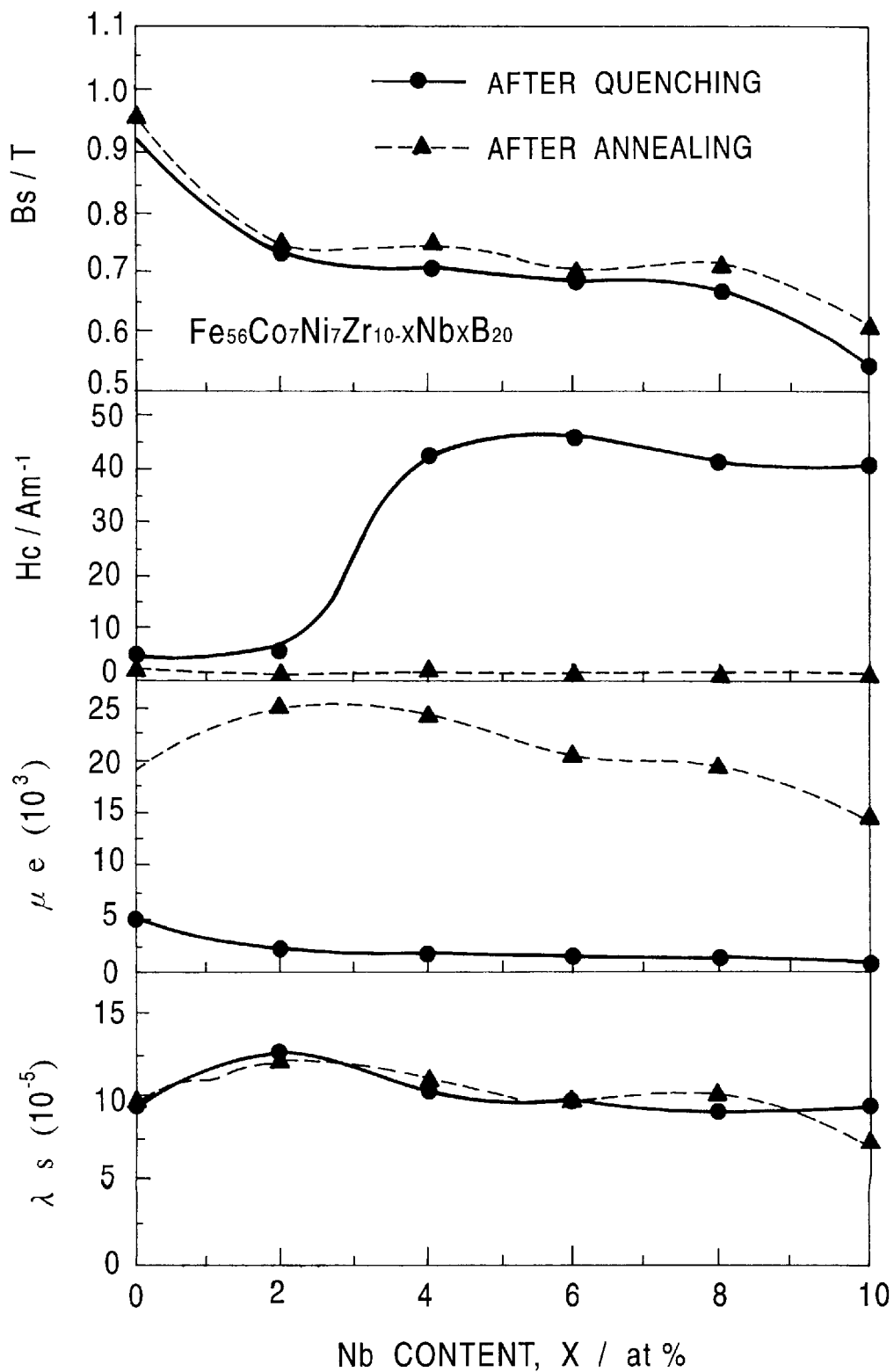
FIG. 16 is a diagram showing the dependence of saturation magnetic flux density (Bs), coercive force (Hc), magnetic permeability ($\mu e$) at 1 kHz and magnetostriction ($\lambda s$) on the Nb content with respect to samples having a composition of $Fe_{56}Co_{b.7}Ni_7Zr_{10-x}Nb_xB_{20}$ (x=0, 2, 4, 6, 8 and 10 atomic %)

FIG. 16 shows the dependence of saturation magnetic flux density (Bs), coercive force (Hc), magnetic permeability ($\mu e$) at 1 kHz and magnetostriction ($\lambda s$) on the Nb content with respect to samples having the composition $Fe_{56}Co_7Ni_7Zr_{10-x}Nb_xB_{20}$ (x=0, 2, 4, 6, 8 and 10 atomic %) after quenching and after annealing at a temperature of 527° C. (800 K) for 5 minutes.

In both samples after quenching and after annealing, the saturation magnetic flux density (Bs) decreases with addition of Nb. The sample not containing Nb had a Bs value of 0.9 (T), and the sample containing 2 atomic % of Nb had a Bs value of about 0.75 (T).

After quenching, the magnetic permeability ($\mu e$) value of the sample not containing Nb was 5031, the $\mu e$ value of the sample containing 2 atomic % of Nb was 2228, and the $\mu e$ value of the sample containing 10 atomic % of Nb was decreased to 906. However, the magnetic permeability is increased by annealing, and particularly in the sample containing 2 atomic % of Nb, a magnetic permeability ($\mu e$) of about 25000 can be obtained.

After quenching, both the sample not containing Nb and the sample containing 2 atomic % of Nb showed a coercive force (Hc) of as low as 50 A/m (=0.625 Oe). Particularly the sample containing 2 atomic % of Nb showed a good value of 5 A/m (=0.0625 Oe). After annealing, even in the sample containing 4 atomic % or more of Nb, excellent coercive force (Hc) can be obtained.

The results shown in FIGS. 14 and 16 indicate that in the alloy sample system shown in the figures, the Nb content is more preferably 0 to 2 atomic % in order to obtain good soft magnetic characteristics. The magnetostriction less depends upon the amount of Nb added.

Figure 17:
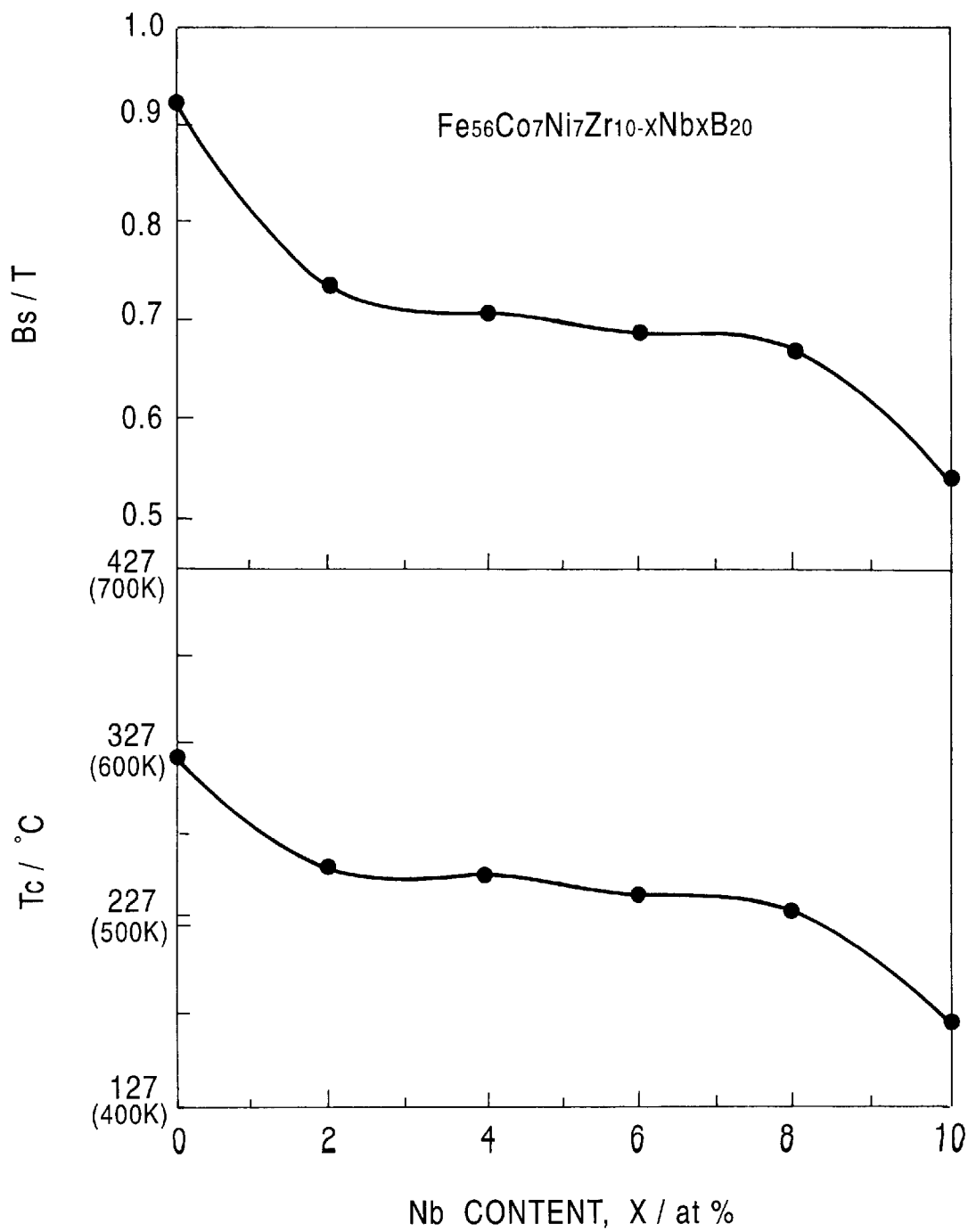
FIG. 17 is a diagram showing the dependence of saturation magnetic flux density (Bs) and Curie temperature (Tc) on the Nb content with respect to samples having a composition of $Fe_{56}Co_7Ni_7Zr_{10-x}Nb_xB_{20}$ (x=0, 2, 4, 6, 8 and 10 atomic %)

FIG. 17 shows the dependence of Curie temperature (Tc) and saturation magnetic flux density (Bs) on the Nb content with respect to samples having the composition $Fe_{56}Co_7Ni_7Zr_{10-x}Nb_xB_{20}$ (x=0, 2, 4, 6, 8 and 10 atomic %) after quenching.

This figure indicates that the Curie temperature (Tc) shows the same dependence on the Nb content as the saturation magnetic flux density (Bs), and that in the Nb content range up to 8 atomic %, the Curie temperature (Tc) is 227° C. (500 K) or more, and high thermal stability is exhibited.

Figure 18:
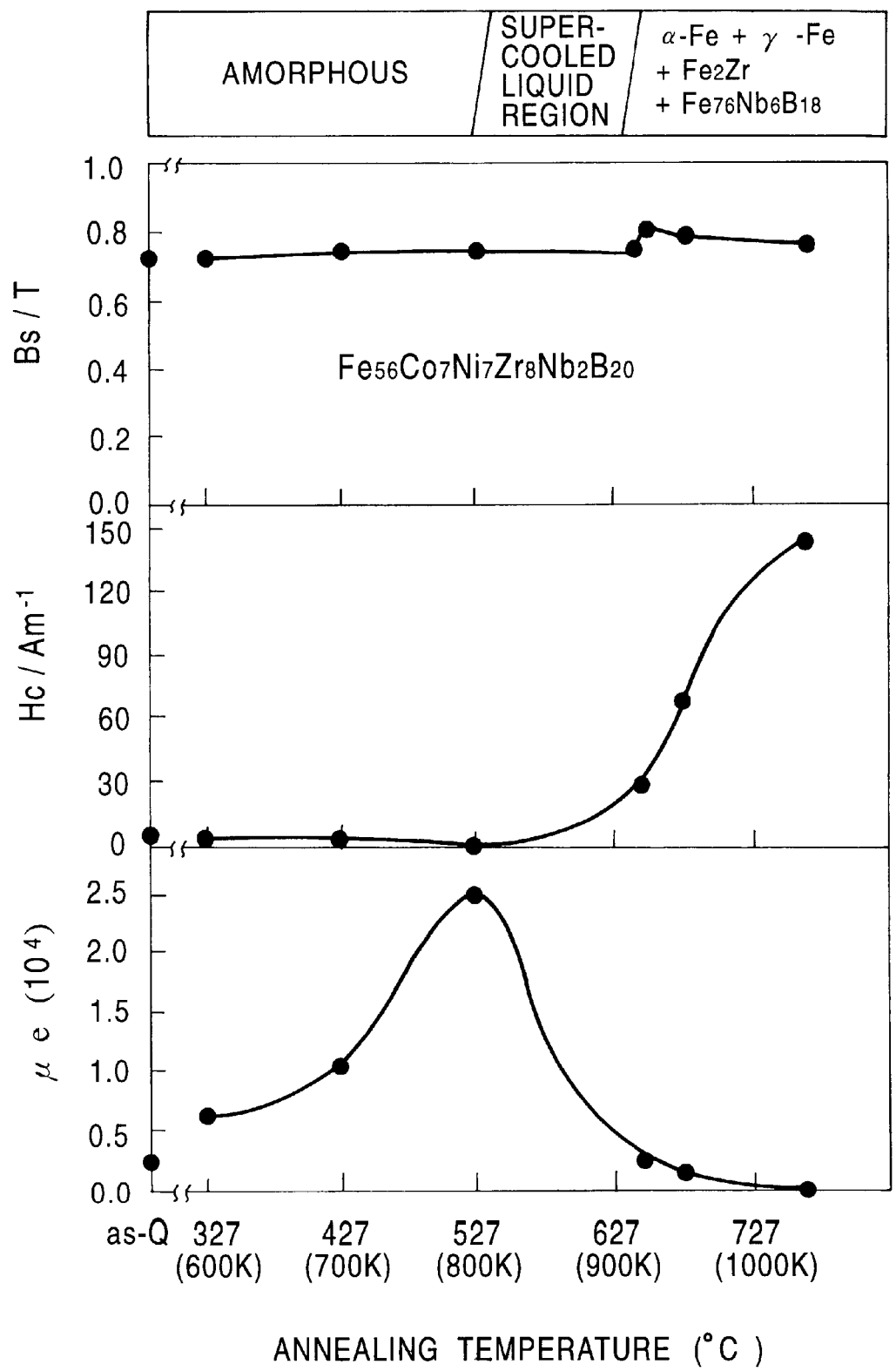
FIG. 18 is a diagram showing the dependence of saturation magnetic flux density (Bs), coercive force (Hc) and magnetic permeability ($\mu e$) at 1 kHz on annealing temperature with respect to a sample having a composition of $Fe_{56}Co_7Ni_7Zr_8Nb_2B_{20}$.

FIG. 18 shows the dependence of saturation magnetic flux density (Bs), coercive force (Hc) and magnetic permeability ($\mu e$) at 1 kHz on the annealing temperature (a retention time of 5 minutes) with respect to a sample having the composition $Fe_{56}Co_7Ni_7Zr_8Nb_2B_{20}$. Although the structure state depending upon the annealing temperature is shown in the upper portion of FIG. 18, in the alloy having this composition, the structure changes from an amorphous single phase state to a crystal structure ($\alpha$-Fe+$\gamma$-Fe+$Fe_2Zr$+ $Fe_{76}Nb_6B_{18}$) through a supercooled liquid region.

The saturation magnetic flux density (Bs) shows no dependence on the annealing temperature. The coercive force (Hc) after annealing at a temperature up to 527° C. (800 K) is equivalent to or more the coercive force after quenching, but the coercive force after annealing at a temperature of 627° C. (900 K) or more deteriorates. Magnetic permeability ($\mu e$) higher than that after quenching can be obtained by annealing at a temperature in the range of 427° C. (700 K) to 627° C. (900 K). This temperature range includes the supercooled liquid region, and the annealing optimum temperature range is preferably set to the supercooled liquid region and the vicinity thereof.

Figure 19:
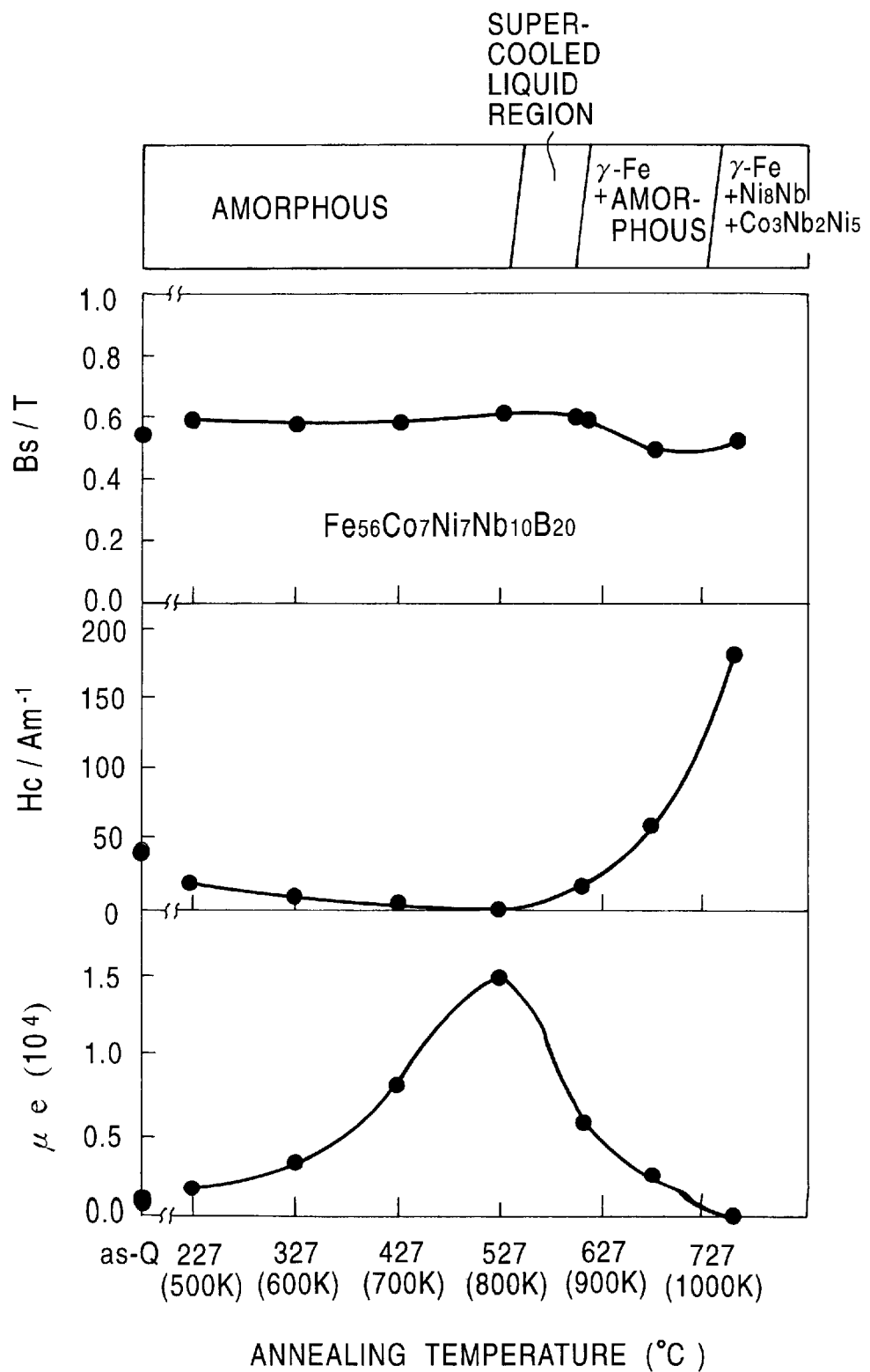
FIG. 19 a diagram showing the dependence of saturation magnetic flux density (Bs), coercive force (Hc) and magnetic permeability ($\mu e$) at 1 kHz on anealing temperature with respect to a sample having a composition of $Fe_{56}Co_7Ni_7N_{10}B_{20}$.

FIG. 19 shows the dependence of saturation magnetic flux density (Bs), coercive force (Hc) and magnetic permeability (e) at 1 kHz on the annealing temperature (a retention time of 5 minutes) with respect to a sample having the composition $Fe_{56}Co_7Ni_7Nb_{10}B_{20}$. Although the structure state depending upon the annealing temperature is shown in the upper portion of FIG. 18, in the alloy having this composition, the structure changes from an amorphous single phase state to a crystal structure ($\gamma$-Fe +$Ni_8Nb$+ $Co_3Nb_2Ni_5$) through a supercooled liquid region and a two-phase state comprising $\gamma$-Fe and an amorphous phase.

The dependence of saturation magnetic flux density (Bs), coercive force (Hc) and magnetic permeability ($\mu e$) on the annealing temperature show the same tendencies as the $Fe_{56}Co_7Ni_7Zr_8Nb_2B_{20}$ alloy shown in FIG. 18. It was also found that annealing at a temperature of 427° C. (700 K) to 627° C. (900 K), i.e., in the supercooled liquid region and the vicinity thereof higher than the Curie temperature, is effective.

As a result of measurement of Vickers hardness, it was found that the soft magnetic amorphous alloys of the present invention show Vickers hardness of 1300 to 1500 Hv. It can be expected from this that the use of a soft magnetic amorphous alloy of the present invention as a core material for a magnetic head provides a magnetic head having good wearing resistance. Also the soft magnetic amorphous alloys of the present invention can be expected to be used as a structural material or a tool, as described below.

Next, experiment was carried out for examining the thickness of a ribbon which can be obtained by a Fe-based soft magnetic amorphous alloy having the composition of the present invention.

Single pure metals of Fe, Co, Ni, Zr and Nb, and a pure boron crystal were mixed in an Ar gas atmosphere, followed by arc melting to produce a master alloy.

Next, the thus-obtained master alloy was melted in a crucible, and then quenched by the single roll method in which the resultant melt was sprayed on a rotating copper roll from a nozzle at the lower end of the crucible under the predetermined injection pressure in an Ar gas atmosphere, to produce a ribbon having a thickness of 20 to 195 $\mu$m. A nozzle having a nozzle diameter of 0.4 to 0.7 mm was used as the nozzle, and the distance between the nozzle tip and the roll, the injection pressure and the roll peripheral velocity were adjusted in the ranges of 0.3 to 0.45 mm, 0.32 to 0.42 kgf/cm$^2$ and 2.6 to 41.9 m/s, respectively, so that ribbons respectively having thicknesses of 20, 40, 100 and 195 $\mu$m could be obtained. The thickness of the ribbon could easily be increased by increasing the injection pressure and decreasing the roll peripheral velocity. In all samples having the thicknesses, no trouble occurred in production of a ribbon of several tens meter.

Figure 20:
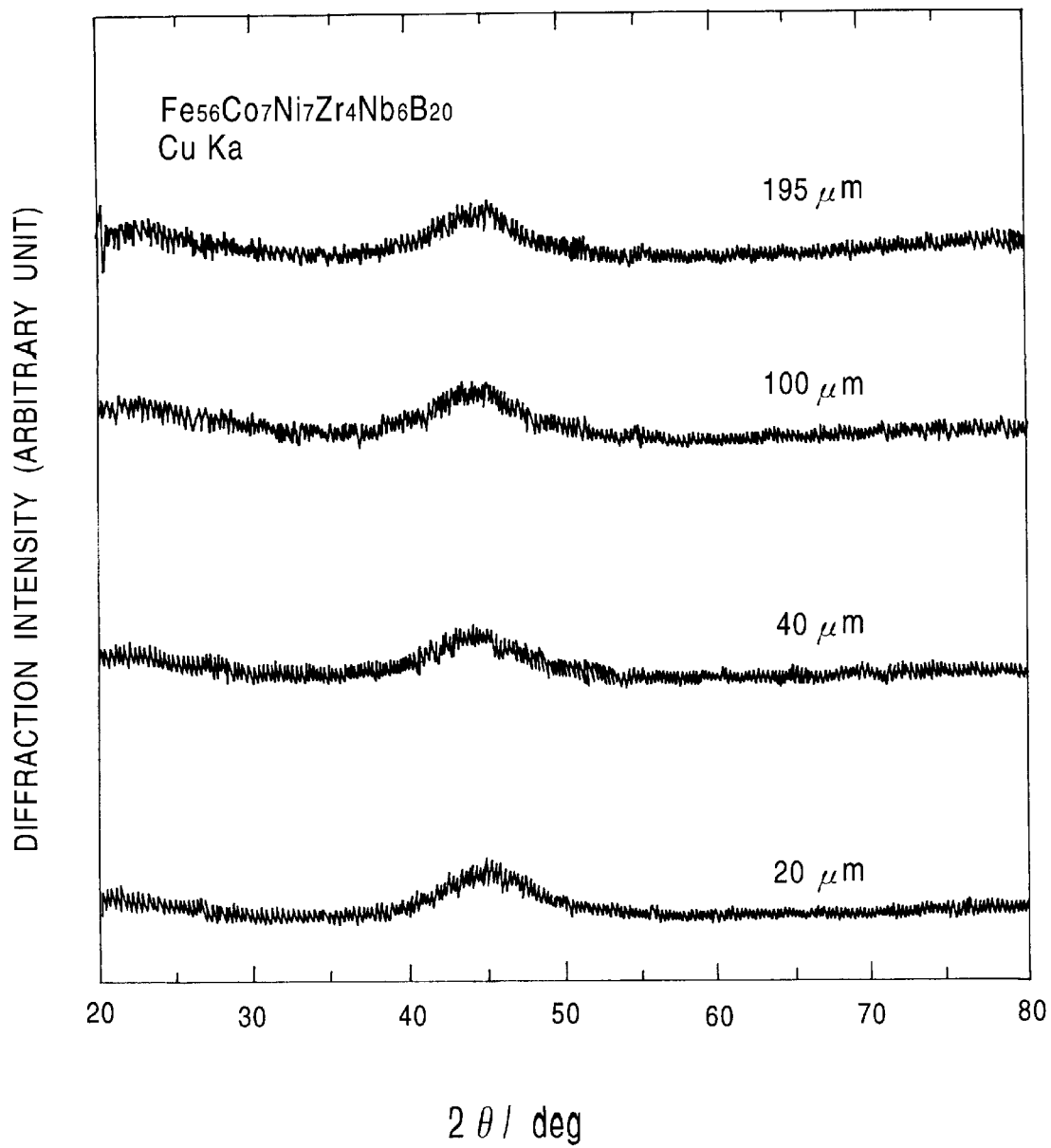
FIG. 20 is a chart showing the X-ray diffraction pattern of each of ribbon samples having a composition of $Fe_{56}Co_7Ni_7Zr_4Nb_6B_{20}$.

FIG. 20 shows the X-ray diffraction pattern of each of the ribbon samples having the composition $Fe_{56}Co_7Ni_7Zr_4Nb_6B_{20}$ which were obtained as described above. The X-ray diffraction patterns shown in this figure reveal that all samples having a thickness of 20 to 195 $\mu$m have a halo pattern at 2$\theta$=40 to 50 (deg) and thus an amorphous single phase structure.

It was apparent from these results that in the composition system of the present invention, a ribbon having an amorphous single phase structure and a thickness of 20 to 195 μm can be produced.

Although, with general amorphous alloys, ribbons having a thickness of about 20 to 40 μm can be produced by the quenching method using a rotating roll, it is difficult to produce a ribbon having a thickness larger than this. Namely, in production of a ribbon having a larger thickness, problems of breakage of the ribbon and crystallization occur.

In the composition system of the present invention, with a supercooled liquid region having a large temperature width ΔTx, it is possible to obtain a thick amorphous ribbon which cannot be obtained by a conventional composition system and production method. This represents the excellent feature peculiar to the alloys of the present invention having a supercooled liquid region having a large temperature width ΔTx which is not observed in conventional materials.

Next pin-shaped samples were formed by an injection casting method using a copper casting mold, and the glass transition temperature (Tg), the crystallization start temperature (Tx), the temperature width (ΔTx) of a supercooled liquid region, Vickers hardness (Hv) and compressive strength (σc, f) were measured.

In this example, a melt having each of alloy compositions was poured into the copper casting mold and cast in a reduced-pressure atmosphere to form a pin-shaped sample having a diameter of 1 to 5 mm, and a length of 50 to 100 mm. The Vickers hardness (Hv) of this sample was measured by using a Vickers microhardness meter with a load of 500 g. For each of the alloy compositions, a sample having a diameter of 2.5 mm and a length of 6.0 mm was formed, and the compressive strength of the sample was measured by using a compressive strength meter (produced by Instron Corp., Model 4204). The results obtained are shown in Table 1.

TABLE 1

| Alloy composition | Tg °C. | Tx °C. | ΔTx °C. | Hv | σc,f Mpa |
|---|---|---|---|---|---|
| $Fe_{61}Co_7Ni_7Zr_{10}B_{15}$ | 522 | 587 | 65 | 1310 | 3400 |
| $Fe_{58}Co_7Ni_7Zr_{10}B_{18}$ | 529 | 600 | 71 | 1340 | 3500 |
| $Fe_{56}Co_7Ni_7Zr_{10}B_{20}$ | 541 | 614 | 73 | 1370 | 3600 |
| $Fe_{56}Co_7Ni_7Zr_8Nb_8B_{20}$ | 555 | 641 | 86 | 1370 | 3600 |
| $Fe_{56}Co_7Ni_7Zr_6Ta_8B_{20}$ | 554 | 642 | 88 | 1360 | 3600 |
| $Fe_{61}Co_7Ni_7Zr_8Nb_8B_{15}$ | 535 | 590 | 50 | 1340 | 3500 |
| $Fe_{61}Co_7Zr_{10}Mo_5W_2B_{15}$ | 625 | 689 | 64 | 1360 | 3800 |

The results shown in Table 1 reveal that in each of the samples in this example, Vickers hardness of 1310 to 1370 is obtained, compressive strength of as large as 3400 to 3800 MPa is obtained, and each sample is an alloy having higher strength than a conventional alloy containing a Fe-based amorphous phase or crystalline phase. With an alloy having the composition $Fe_{61}Co_7Zr_{10}Mo_5W_2B_{15}$, samples respectively having diameters of 3 mm and 5 mm and no precipitation of crystals are obtained, and the surfaces thereof are smooth and have metallic luster. It is thus expected that the alloy has good adhesion to a high-hardness thin film. Therefore, the use of the high-hardness amorphous alloy of the present invention as a cutting tool can provide a tool having good cutting performance.

Next Co, a T group element (Fe), a M group element (Zr) and B were mixed at a predetermined ratio in an Ar gas atmosphere, followed by arc melting to produce master alloys of Co-based amorphous soft magnetic alloys having the following two compositions.

Example 1: $Co_{67}Fe_3Zr_{10}B_{20}$

Example 2: $Co_{69}Fe_3Zr_8B_{20}$

Next, each of the master alloys was melted in a crucible and quenched by the single roll method in which the melt was sprayed on a copper roll rotating at 40 m/s from a nozzle having a diameter of 0.4 mm at the lower end of the crucible at an injection pressure of $0.39 \times 10^5$ Pa in an Ar gas atmosphere to a sample of an amorphous alloy ribbon having a width of 0.4 to 1 mm and a thickness of 13 to 22 μm. The Curie temperature and resistivity of each sample were measured. The results obtained are shown in Table 2.

TABLE 2

| Measurement Item (unit) | Curie Point (° C.) | Resistivity (μΩ· cm) |
|---|---|---|
| Example 1 | 328° C. | 175 |
| Example 2 | 343° C. | 172 |

The results shown in Table 2 reveal that each of the samples has a high Curie point and thus has high thermal stability. Also, since each of the samples has high resistivity, the use as a core material for a transformer enables a decrease in an overcurrent loss and thus suppression of a core loss.

What is claimed is:

1. A Co-based amorphous soft magnetic alloy expressed by the following formula:

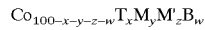

$Co_{100-x-y-z-w}T_xM_yM'_zB_w$ wherein T is one or both of Fe an Ni, M is at least one of Zr, Nb, Ta, Hf and Mo, M' is at least of W, Cr, Mn, Ru, Rh, Pd, Os, Ir, Pt, Al, Ga, Ge, C and P, wherein $0 \leq x \leq 20$ (atomic %), $5 \leq y \leq 15$ (atomic %), $0 \leq z \leq 10$ (atomic %) and $15 \leq w \leq 22$ (atomic %), wherein the temperature width ΔTx of a supercooled liquid region expressed by the equation ΔTx=Tx−Tg (wherein Tx is the crystallization start temperature, and Tg is the glass transition point) is 20° C. or more.

2. A Co-based amorphous soft magnetic alloy according to claim 1 having a glass transition point Tg, wherein $8 \leq x \leq 20$ (atomic %).

3. A Co-based amorphous soft magnetic alloy according to claim 1, wherein $8 \leq x \leq 20$ (atomic %), and the absolute value of magnetostriction is $1 \times 10^{-6}$ or less.

* * * * *